United States Patent
Suleiman et al.

(10) Patent No.: US 11,414,551 B2
(45) Date of Patent: Aug. 16, 2022

(54) GRAPHENE-CYCLODEXTRIN COMPLEX AND ITS USE IN CORROSION PREVENTION

(71) Applicant: KING FAHD UNIVERSITY OF PETROLEUM AND MINERALS, Dhahran (SA)

(72) Inventors: Rami Khalid Suleiman, Dhahran (SA); Tawfik Abdo Saleh, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 159 days.

(21) Appl. No.: 16/717,484

(22) Filed: Dec. 17, 2019

(65) Prior Publication Data

US 2021/0179859 A1    Jun. 17, 2021

(51) Int. Cl.

| | |
|---|---|
| C09D 5/08 | (2006.01) |
| C08B 3/12 | (2006.01) |
| B05D 1/02 | (2006.01) |
| B05D 3/12 | (2006.01) |
| B05D 7/00 | (2006.01) |
| B05D 7/14 | (2006.01) |
| B05D 7/24 | (2006.01) |
| C01B 32/194 | (2017.01) |
| C08B 37/16 | (2006.01) |

(52) U.S. Cl.
CPC ............. *C09D 5/08* (2013.01); *B05D 1/02* (2013.01); *B05D 3/12* (2013.01); *B05D 7/14* (2013.01); *B05D 7/24* (2013.01); *B05D 7/586* (2013.01); *C01B 32/194* (2017.08); *C08B 37/0012* (2013.01)

(58) Field of Classification Search
CPC . C08B 37/0012; C08B 37/0015; C08K 3/042; C09D 5/08
USPC .......................................... 536/1.11; 514/23
See application file for complete search history.

(56) References Cited

U.S. PATENT DOCUMENTS

2019/0048202 A1    2/2019    Frauenrath et al.

FOREIGN PATENT DOCUMENTS

| CN | 107058996 A | 8/2017 |
| CN | 109486348 A | 3/2019 |
| CN | 109749544 A | 5/2019 |

OTHER PUBLICATIONS

Guo et al., ACS Nano, 2010, 4(7), 4001-4010.*
Liu et al, Chemical Engineering Journal, 2014, 257, 299-308.*
Yujing Guo, et al., "Cyclodextrin Functionalized Graphene Nanosheets with High Supramolecular Recognition Capability: Synthesis and Host-Guest Inclusion for Enhanced Electrochemical Performance", ACS Nano, vol. 4, No. 7, Jun. 28, 2010, pp. 4001-4010 (Abstract only).
Chengbao Liu, et al., "Efficient Graphene/Cyclodextrin-Based Nanocontainer: Synthesis and Host-Guest Inclusion for Self-Healing Anticorrosion Application", ACS Applied Materials & Interfaces, vol. 10, No. 42, Sep. 27, 2018, pp. 36229-36239 (Abstract only).
Viswanathan S. Saji, "Supramolecular concepts and approaches in corrosion and biofouling prevention", Corrosion Reviews, vol. 37, Issue 3, 2019, pp. 187-230.
Yi He, et al., "Fabrication study of a new anticorrosion coating based on supramolecular nanocontainer", Synthetic Metals, vol. 212, Feb. 2016, pp. 186-194 (Abstract only).
K. Haruna, et al., "Cyclodextrin-based functionalized graphene oxide as an effective corrosion inhibitor for carbon steel in acidic environment", Progress in Organic Coatings, vol. 128, Mar. 2019, pp. 157-167 (Abstract only).
Eman M. Fayyad, et al., "Oleic acid-grafted chitosan/graphene oxide composite coating for corrosion protection of carbon steel", Carbohydrate Polymers, vol. 151, Oct. 20, 2016, pp. 871-878 (Abstract only).
Saviour A. Umoren, et al., "Application of carbohydrate polymers as corrosion inhibitors for metal substrates in different media: A review", Carbohydrate Polymers, vol. 140, Apr. 20, 2016, pp. 314-341 (Abstract only).
Xiaoming Yang, et al., "Well-Dispersed Chitosan/Graphene Oxide Nanocomposites", ACS Applied Materials & Interfaces, vol. 2, No. 6, Jun. 7, 2010, pp. 1707-1713.

* cited by examiner

*Primary Examiner* — Ganapathy Krishnan
(74) *Attorney, Agent, or Firm* — Oblon, McClelland, Maier & Neustadt, L.L.P.

(57) ABSTRACT

A complex of beta-cyclodextrin and graphene (CD-G) and a method of use of the complex in corrosion protection of the metal surfaces exposed to high saline concentrations. Composite laminates comprise CD-G, zinc (optionally magnesium) powder embedded in a resin matrix and adjacent to the metal, followed by polyurethane comprising a polymeric zinc chelator, followed by a hermetic sealant layer and finally by a hydrophobic self-cleaning fouling release layer as a topcoat. Optional managed stress of the laminated layers by temperature swings and mechanical vibration ensures resolution of local strain at the formative stage and not during functioning, producing defects that are healed during deposition of the next layer. More than 99% of the zinc and other toxic ions extracted from the metal and coating are intercepted by the selective chelator layer insulated under the sealer and fouling-release layers.

6 Claims, 10 Drawing Sheets

GRAPHENE-CYCLODEXTRIN COMPLEX AND ITS USE IN CORROSION PREVENTION

STATEMENT OF ACKNOWLEDGEMENT

This project was funded by the National Plan for Science, Technology and Innovation (MARIFAH)—King Abdulaziz City for Science and Technology—through the Science & Technology Unit at King Fand University of Petroleum & Minerals (KFUPM), the Kingdom of Saudi Arabia, award number (14-ADV147-04).

BACKGROUND OF THE INVENTION

Technical Field

The present disclosure relates to a composite graphene-cycloheptaglucosan anti-corrosive composition, a coating comprising the composition, and methods of coating metal substrates with the composition, and methods of preparing and characterizing the coated metal substrates.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Graphene is an intrinsic two-dimensional sheet in a hexagonal configuration with carbon atoms in sp2 carbon hybridization. Graphene has attracted extensive attention due to its unique electronic structure, two-dimensional nature, flexibility, and chemical stability, and good electronic conductivity (A. K. Geim, *Science*, 2009, v. 323, pp. 1530-1534; A. K. Geim, K. S. Novoselov, *Nat. Mater,* 2007, v. 6, pp. 183-186; A. L. Higginbotham, D. V. Kosynkin, A. Sinitskii, Z. Sun, J. M. Tour, *ACS Nano*, 2010, v. 4, pp. 2059-2069)

Graphene finds utility in various areas, such as corrosion protection, chemical adsorption, and electrochemical sensing using modified electrocatalytic nanoparticles, in addition to being used as the anode in lithium batteries (J. L. Xia, F. Chen, J. H. Li, N. Tao, *J. Nat. Nanotechnol.* 2009, v. 4, pp 505-509; C. B. Jacobs, M. J. Peairs, B. Venton, *J. Anal. Chim. Acta,* 2010, v. 662, pp 105-127; K. Zhou, Y. Zhu, X. Yang, J. Luo, C. Li, S. Luan, A, *Electrochim. Acta,* 2010, 55, 3055-3060; K. Kalcher, *Electroanalysis,* 1995, v. 7, pp 5-15; T. A. Saleh, M. M. Al-Shalalfeh, A. A. Al-Saadi, *Scientific reports,* 2016, v. 6, pp 32185).

Graphene finds utility in electrochemistry-related applications because of its high surface-to-mass ratio (Y. Liu, D. Y. C. Zeng, Z. Miao, L. Dai, *Langmuir,* 2010, v. 26, pp. 6158-6160; K. E. Yakovleva, S. A. Kurzeev, S. A.; *Appl. Biochem. Microbiol.,* 2007, v. 43 pp 661-668), low cost of production and heterogeneous electron transfer rate, high carrier charge mobility (C. Apetrei, I. M. Apetrei, S. Villanueva, J. A. de Saja, F. Gutierrez-Rosales, M. L. Rodriguez-Mendez., *Anal. Chim. Acta,* 2010, v. 663, pp. 91-97; C. Apetrei, M. L. Rodriguez-Méndez, J. A. de Saja, *Modified. Sensors and Actuators B: Chemical,* 2005, v. 111, pp 403-409, C. Apetrei, M. L. Rodriguez-Méndez, V. Parra, F. Gutierrez, J. A. de Saja, *Sens. Actuat. B Chem.,* 2004, v. 103, pp. 145-152, T. A. Saleh, A. A. Al-Absi, *Journal of Molecular Liquids,* 2017, v. 248, pp. 577-585, T. A. Saleh, A. Sari, M. Tuzen, *Journal of Molecular Liquids,* 2016, v. 219, pp. 937-945). The same ability to generate remarkably large monolayer surfaces of negligible thickness, adhering to the protected metal, and insulating it from the oxidants was noted early. It became the basis of interest to graphene as an anti-corrosive.

Corrosion is a destructive phenomenon that results in substantial economic losses and many safety issues since structural defects developing as a result of corrosion facilitate mechanical failure (G. Hamer, *Biotechnol. Adv.,* 2003, vol. 22, no. 1-2, pp. 71-79; G. Koller, U. Fischer, and K. Hungerbühler, *Ind. Eng. Chem. Res.,* 2000, vol. 39, no. 4, pp. 960-972; R. Javaherdashti, Anti-Corrosion Methods Mater., 2000, vol. 47, no. 1, pp. 30-34). The corrosion of steel has a very high environmental and economic impact, because of its extensive use in many industries. Mild steel is the most widely used material in construction because of its low cost as compared to other materials offering similar physical and chemical properties, but its corrosion resistance is inferior. The global cost of corrosion is estimated to be $2.5 trillion (USD) which is approximately equivalent to 3.4% of the total global Gross Domestic Product (GDP) (G. Koch, J. Varney, N. Thompson, O. Moghissi, M. Gould, and J. Payer, *NACE Int.,* 2016, pp. 1-3). A significant proportion of this cost, approximately 15-35%, would be avoided by implementation of suitable anti-corrosion technologies. The use of corrosion-resistant material, cathodic protection, coatings, and the addition of corrosion inhibitors are the four practical methods usually employed for corrosion control. Among the available methods of corrosion control, the use of functional coatings is one of the most popular, because of its low-cost and ease of application (R. Suleiman, M. Estaitie, M. Mizanurahman, *J. Appl. Polym. Sci.,* 2016, DOI: 10.1002/APP.43947, R. Suleiman, H. Dafalla, B. El Ali, 2015, *RSC Advances,* v. 5, pp. 39155-39167). The desired properties of protective coating require controlling the chemistry of the polymeric base or the incorporated functional additive (R. T. Sakai, F. M. Di L. da Cruz, H. G. de Melo, A. V. Benedetti, C. V. Santilli, P. H. Suegam, *Prog. Org. Coat.,* 2012, v. 74, pp. 288-301; U. Eduok, R. Suleiman, J. Gittens, M. Khaled, T. J. Smith, R. Akid, B. El Ali, A. Khalil, *RSC Advances,* 2015, v. 5, pp. 93818-93830; U. Eduok, R. Suleiman, M. Khaled, R. Akid, *Prog. Org. Coat,* 2016, v. 93, pp. 97-108). Graphene derivatives display unique properties such as high surface area, chemical resistance, thermal and electrical conductivity, enhanced mechanical strength, low water permeability, and high hydrophobicity (N. T. Kirkland, T. Schiller, N. Medhekar, and N. Birbilis, *Corros. Sci.,* 2012, vol. 56, pp. 1-4; D. Prasai, J. C. Tuberquia, R. R. Harl, G. K. Jennings, and K. I. Bolotin, *ACS Nano,* 2012, vol. 6, no. 2, pp. 1102-1108; J. Mondal, M. Marandi, J. Kozlova, M. Merisalu, A. Niilisk, and V. Sammelselg, *J. Chem. Chem. Eng.,* 2014, vol. 8, no. JANUARY, pp. 786-793; B. Ramezanzadeh, S. Niroumandrad, A. Ahmadi, M. Mandavian, and M. H. Mohamadzadeh Moghadam, *Corros. Sci.,* 2016, vol. 103, pp. 283-304; A. B. Ikhe, A. B. Kale, J. Jeong, M. J. Reece, S. H. Choi, and M. Pyo, Corros. Sci., 2016, vol. 109, pp. 238-245; H. Puzanowska-Tarasiewicz, E. Wotyniec, A. Kojlo, *Journal of Pharmaceutical and Biomedical Analysis,* 1996, v. 14, pp. 267-271; H, Karimi-Maleh, AA Ensafi, H Beitollahi, V. Nasiri, M. A Khalilzadeh, P. Biparva, Ionics, 2012, v. 18, pp. 687-694) which makes these materials very promising additives in coating formulations. However, the synergy and compatibility between the graphene derivatives and base polymeric coating resins remained a very challenging concern for the R&D of the coating industry.

Graphene is known to tightly adhere to the original metal surface and form a primer for the entire coating with high adhesion strength. The predominant mechanism of enhanced corrosion-resistance is a barrier effect preventing oxidant species from accessing electron-rich metal. In the case of zinc dispersions coated on the steel, graphene facilitates electronic conductance between the zinc particles facilitating the protective sacrificial anode effect of the coating. Graphene, however, is known to facilitate corrosion of steels when partially peeled off (W. Sun, L. Wang, T. Wu, M. Wang, Z. Yang, Y. Pan, and G. Liu, *Chemistry of Materials*, 2015, 27(7), pp. 2367-2373). The incorporation of cyclodextrin inhibits the potential peeling.

CN109486348A discloses a fire-proof anti-corrosion paint and preparation method. Referring to the paint preparation method, the invention uses different biomass materials to prepare flame-retardant anti-corrosion micro-spheres, discloses grafting the functionalized graphene on the microspheres, and then forming a composite with the aqueous resin. The reference and the disclosed invention are patentably distinct due to multiple additional components needed for the method to perform in the prior art publication. The method of preparation of the protective coating and its structural morphology is also distinct from the inventive.

C. Liu, H. Zhao, P. Hou, B. Qian, X. Wang, C. Guo, and L. Wang L. in *ACS Appl. Mater. Interfaces* 2018, v. 10, 42. Pp. 36229-36239 discloses a graphene/β-cyclodextrin-based supramolecular nanocontainer with inhibitor-encapsulating capacity and permeability barrier properties. The benzotriazole (BTA)-loaded nanocontainers were then used to endow the coating system with passive and active anticorrosion performance. Local electrochemical impedance spectroscopy (LEIS) was performed to characterize the self-healing behavior of composite coatings. Results indicated that BTA release from cyclodextrin-graphene complexes recovers the protective capability of the scratched coatings. This material comprises BTA.

K. Haruna, T. A. Saleha, I. B. Obot, S. A. Umoren, in *Progress in Organic Coatings Volume*, v. 128, pp. 157-167 discloses cyclodextrin-based functionalized Graphene Oxide (CD-GO), synthesized utilizing cost-effective waste graphite as a source for the production of graphene. The obtained novel material, CD-GO, was characterized and evaluated for corrosion inhibition of X60 carbon steels in solutions of HCl at room temperature. CD-GO demonstrated high inhibition efficacy, which enhances with increasing CD-GO concentrations. The SEM/EDX, FTIR, and UV-vis surface characterization analysis proves the growth of the protective film of CD-GO on the steel surface. The CD-GO materials adsorb on the surface of the steel via oxygen atoms of the CD-GO, forming a CD-GO/metal complex on the steel surface.

C. Liu, J. Li, Z. Jin, P. Hou, H. Zhao, and L. Wang, *Composites Communications*. 2019, v. 15, pp 155-61 discloses a novel graphene-epoxy nanocomposite with intrinsic self-healing behavior underwater and superior anticorrosion properties constructed via host-guest chemistry. Typically, the β-cyclodextrin/graphene (CD-G) was firstly synthesized and then incorporated into the epoxy network to serve as "macro-crosslinker." The artificial damage easily heals through the dynamic host-guest recognition between cyclodextrin in graphene surface and adamantane at polymer chains. Meanwhile, the impermeable graphene nanosheets largely prevented the electrolyte penetration and improved the healing efficiency for composite coatings. This graphene-epoxy nanocomposite possessed efficient self-healing and superior anti-penetration functions, simultaneously, endowing the composite coatings with smart anticorrosion performance.

There is an unmet need in an integrated, multilayer, and ecologically acceptable metal protective coating, suitable for high salinity environments, combining multiple anti-corrosion mechanisms, being mechanically strong, preventing biofouling and producing tangible economic effect. Such a superior solution is the subject of the present invention.

BRIEF SUMMARY

According to a first aspect, the present disclosure entails the discovery of a new composite coating that can be applied in an environmentally safe manner to protect the mild steel substrate from corrosion in the saline medium. The composite coating comprises a graphene nanosheet decorated with cycloheptaglucosan (beta-cyclodextrin) as an additive to a basal coating.

According to a second aspect, the present disclosure describes an industrial-scale synthesis of un-oxidized graphene with the graphite powder as the starting material.

According to a third aspect, the present disclosure describes an industrially applicable preparation method of CD-G complex using inexpensive reagents, mild conditions, and over a shorter timeframe.

According to the fourth aspect, the present disclosure describes an industrially applicable method of coating construction metals, including steel, aluminum, titanium, magnesium, and copper alloys without limitation.

According to a fifth aspect, the present disclosure describes an analysis of surface coating morphology and its functional characterization.

According to a sixth aspect, the present disclosure describes testing methodology for evaluation of the coating performance.

According to a seventh aspect, the coating is integrated, providing a barrier, sacrificial anode, and antifouling functionalities in a single painting procedure.

According to an eighth aspect, the integrated laminated coating is stress-fortified by enduring rapid temperature swings and mechanical vibration in the process of deposition, forming the defects, and healing them by the next deposition.

According to a ninth aspect, the integrated laminated coating is ecologically "green", with the zinc-chelator particles placed adjacent to the zinc powder primer protecting the steel together with the modified graphene barrier.

According to a tenth aspect, the integrated laminated coating is self-healing by absorbing the graphene-cyclodextrin monolayers on the hydrophobic sites produced by the pre-modification of the resins used in the laminate construction.

According to an eleventh aspect, "green" performance is achievable by the replacement of zinc by magnesium in the coating primer.

According to a twelfth aspect, incorporation of sealants and polyurethanes in the laminate introduces additional robust barriers to the contact between the metal and saline.

According to a thirteenth aspect, incorporation of intrinsically conductive polymers, augmented by TiO2 instead of metal powder in the protective primer produces a "green" ecologically acceptable coating.

According to a fourteenth aspect, the invention is especially suitable to the situation when the material contributes a substantial fraction of overall costs in producing a construct exposed to high salinity and where the return on investment (ROI) depends on uninterrupted exploitation of the construct.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

Better appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
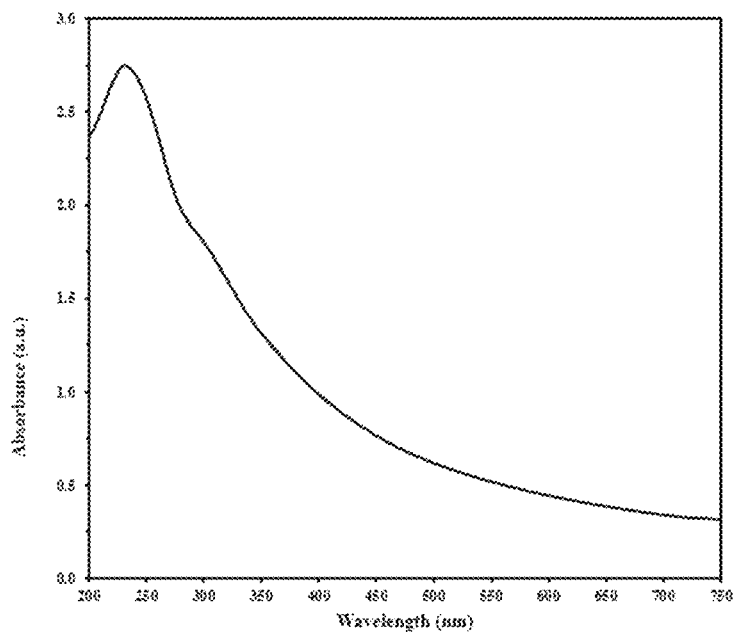
FIG. 1. UV-vis absorption spectra of dispersion the graphene.

Embodiments of the present disclosure will now be described more fully hereinafter with reference to the accompanying drawings, in which some, but not all of the embodiments of the disclosure are shown.

The present disclosure will be better understood with reference to the following definitions.

As used herein, the words "a" and "an" and the like carry the meaning of "one or more". Additionally, within the description of this disclosure, where a numerical limit or range is stated, the endpoints are included unless stated otherwise. Also, all values and subranges within a numerical limit or range are specifically included as if explicitly written out.

As used herein, the terms "optional" or "optionally" means that the subsequently described event(s) can or cannot occur or the subsequently described component(s) may or may not be present (e.g. 0 wt %).

As used herein, the term "CD-G" means "cyclodextrin-graphene complex".

As used herein, the term "primer", "inner", "inside", or "interior" painting refers to the first painting layer in the nearest position to the surface of the protected metal.

As used herein, the term "basal matrix" refers to the polymerizable binder in the primer which is filled with the CD-G complex and/or other fillers and polymerized, producing the finished primer layer.

As used herein, the term "topcoat", "outer", "outside", or "exterior" painting refers to the painting(s) deposited on the surface of the interior paintings, defined above.

As used herein, the term "LNG" refers to liquified natural gas.

As used herein, the term "overgrowth" refers to biofouling or fouling of the ship surface by weed, biofilms, barnacles, polyps.

As used herein, the term "cycloheptaglucosan" is synonymous to "beta-cyclodextrin".

As used herein, the term "first intermediate layer" refers a layer above a primer layer (which is a layer adjacent to a protected metal surface). A further layer above the first layer but not the outermost layer is termed the "second intermediate layer".

As used herein, the term "stress-fortifying" refers to a process of improving the lifespan of a coating, comprising subjecting a coating or sub-coating of a laminate to a thermal or vibrational stress in its semi-cured form, producing small defects and healing them by deposition of the next sub-layer in the laminate.

As used herein, the term "conductive polymer" comprises polyaniline (PANT), polypyrrole (PPY) or any other polymeric conjugated aryls, acetylenics or hetero-aryls capable of forming a co-planar $\pi$-orbital delocalizing the electron pool of the entire polymer. With each conjugated atomic orbital accommodating two electrons with the opposing spins and with only electron present, the semi-filled overlapped orbitals allow propagation of charges with little resistance, resembling metals.

As used herein, the term "chartering rate" comprises the fraction of the days per year when a vessel is chartered for cargo delivery, a function of management, seaworthiness, and reputation.

Having generally described this disclosure, a further understanding can be obtained by reference to certain specific examples which are provided herein for purposes of illustration only and are not intended to be limiting unless otherwise specified.

The present disclosure includes a composite graphene material that can be mixed with a basal coating to yield a composite coating that can be used effectively for the protection of mild steel substrates against corrosion in a saline medium.

Industrial-scale production of graphene is a part of this disclosure due to the potential applicability of the anti-corrosion method to multiple metal alloys in different high salinity contexts, such as construction materials, bridges, machinery, piping, tools, maritime vessels, fish farming equipment, nets. Graphite is a relatively cheap material according to the STATISTA website, with the price range depending on the size of the flakes. In 2016, the price for large graphite flakes was expected to reach $996 U.S. per metric ton. Until 2020, the price for this flake grade was expected to increase to $1,165 per metric ton. Graphite prices depend on factors including—flake size and purity. Large flake (+80 mesh) and high carbon (+94%) varieties command the premium pricing segment. Considering that a typical coating thickness is ~50 micrometers, the cost of graphite starting material is very acceptable.

One component described herein and useful for a process described herein is graphene oxide. The non-limiting list of the reagents preferred to produce this material includes sulfuric acid ($H_2SO_4$), sodium nitrate ($NaNO_3$), potassium permanganate ($KMnO_4$), potassium ferrocyanide, and graphene. In preferred and non-limiting embodiments, the ferrocyanide (CAS number 14459-95-1) has a purity of 99%; reagents may be purchased from Sigma-Aldrich Company. In yet another preferred embodiment, US. Graphite powder (99.99%) particle size≤150 µm is used.

The graphene oxide was prepared using a modified Hummer's method and by using graphite powder as a base material. The synthesis procedure is as follows: in a 1 L volumetric flask, graphite powder (5 g) was added to a 50 mL of concentrated sulfuric acid ($H_2SO_4$) and 10 g of sodium nitrate ($NaNO_3$). The resulting solution was stirred for 60 minutes at 4° C. in an ice-bath. After that, potassium permanganate ($KMnO_4$) powder (4 g) was slowly added to the flask, and the mixture was heated to 45° C. and stirred for another 60 minutes. Distilled water (100 mL) was then added to the above mixture over 25 minutes. Finally, 200 mL of water and 10 mL of 30% $H_2O_2$ were added to the mixture. The unexfoliated graphite in this mixture was removed by repeated centrifugation and filtration (first by 6% HCl and then with water). and the final product was washed thoroughly with water and dried under vacuum at 70° C. for overnight. The process illustrated in this disclosure can be scaled-up by the methods known to the skilled in the art. In a non-limiting embodiment, the parameters of the existing production cycle by Hummer's method can be emulated (See J. Chen, Y. Li, L. Huang. C. Li, and G. Shi, *Carbon*, 2015, v. 81, pp. 826-834; V. C. Tung, M. J. Allen, Y. Yang, R. B. Kaner, *Nature nanotechnology*, 2009, v. 4(1), 25, incorporated herein by reference in its entirety). In the alternative non-limiting embodiments, graphene oxide can be produced by a "green" method excluding the nitric oxide off-gas formation during graphite oxidation and exfoliation in the presence of nitrates (See J. Chen, B. Yao, C. Li, G. Shi, Gaoquan, *Carbon*, 2013, v. 64, pp 225-229, incorporated herein by reference in its entirety).

Figure 4A:
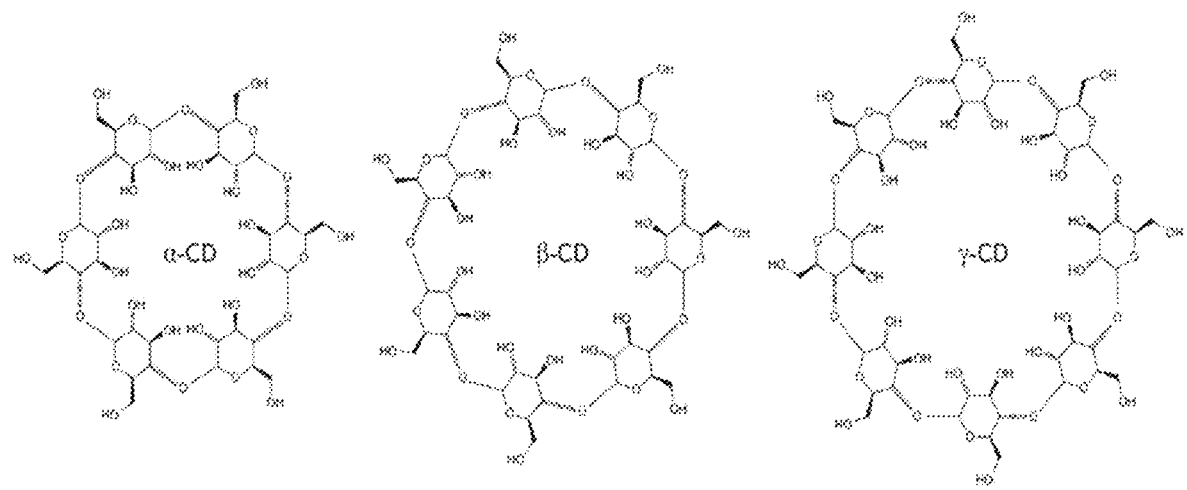
FIG. 4A shows a structure of alpha, beta and gamma cyclodextrins.
Figure 4B:
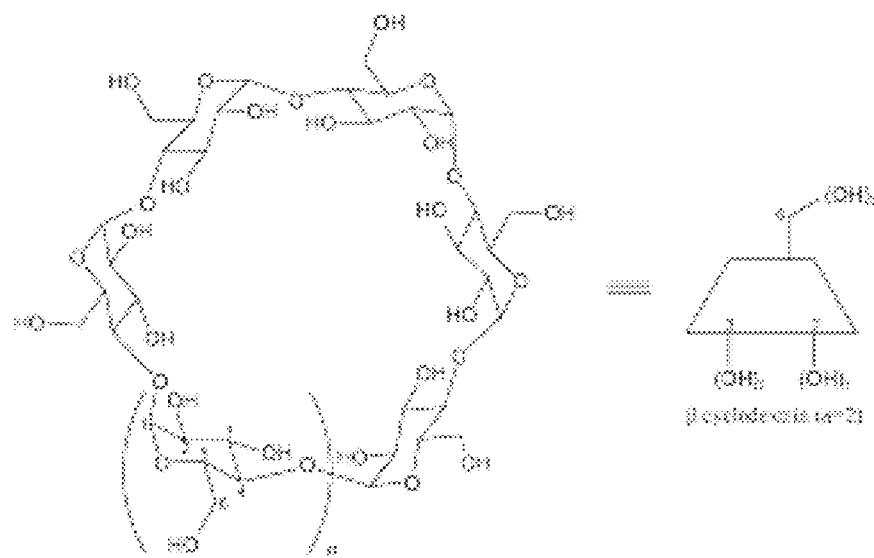
FIG. 4B. Three-dimensional cup-like structure of cyclodextrin rings.

Beta-cyclodextrin (cycloheptaglucosan) can be produced enzymatically from starch sources. Commonly cyclodextrin glycosyltransferase (CGTase) is employed along with α-amylase. First, starch is liquified either by heat treatment or using α-amylase, then CGTase is added for enzymatic conversion. CGTases produce mixtures of cyclodextrins; thus, the product of the conversion results in a mixture of the three main types of cyclic molecules, in ratios that are strictly dependent on the enzyme used: each CGTase has its own characteristic α:β:γ synthesis ratio. Purification of the three types of cyclodextrins takes advantage of the different water solubility of the molecules: β-CD which is poorly water-soluble (18.5 g/l or 16.3 mM at 25° C.) can be easily retrieved through crystallization while the more soluble α- and γ-CDs (145 g/l and 232 g/l respectively) are usually purified by means of expensive and time-consuming chromatography techniques. As an alternative, a complexing agent can be added during the enzymatic conversion step. Such complexing agents (usually organic solvents like toluene, acetone, or ethanol) form a complex with the desired cyclodextrin which subsequently precipitates. The complex formation drives the conversion of starch towards the synthesis of the precipitated cyclodextrin, thus enriching its content in the final mixture of products. FIG. 4 shows beta-cyclodextrin in 3D and the family of alpha, beta and gamma cyclodextrin species, differing by the number of glucan moieties in the ring: 6 for alpha, 7 for beta and 8 for gamma (FIG. 4A). The molecular of beta-cyclodextrin forms a cup-like conformation with a cavity for cooperative binding of polar and non-polar ligands. The single (—$CH_2$—OH) side chain corresponds to the carbon (6) in the glucose ring (FIG. 4B). The cavity binding "guest" small molecules is also present in alpha and gamma cyclodextrins.

Wacker Chemie AG uses dedicated enzymes, that can produce alpha-, beta- or gamma-cyclodextrin specifically. (See J. Szejtli, *Chem. Rev.*, 1998, v. 98 (5), pp 1743-1754; A. Biwer, G. Antranikian, E. Heinzle, *Applied Microbiology and Biotechnology*, 2002, 59 (6), pp 609-17; incorporated herein by reference in entirety). With extensive applicability in the food industry, pure and inexpensive beta cyclodextrin is readily available. Suppliers include Trappsol® Cyclodextrins by CTD Inc., Chemical Book, CAVCON, SIGMA ALDRICH, CARBOMER. More detailed list of suppliers is available at PubChem.com, with the CAS 7585-39-9, 37331-89-8, 47918-72-9, 449728-55-6, 1187028-35-8, 1269982-56-0, 1532526-96-7, 1714824-77-7, 896437-63-1, synonyms such as "kleptose" or "betadex", SID numbers 329749476; 374223156; 249869390 and cross-referenced numbers without limitation.

Figure 5:
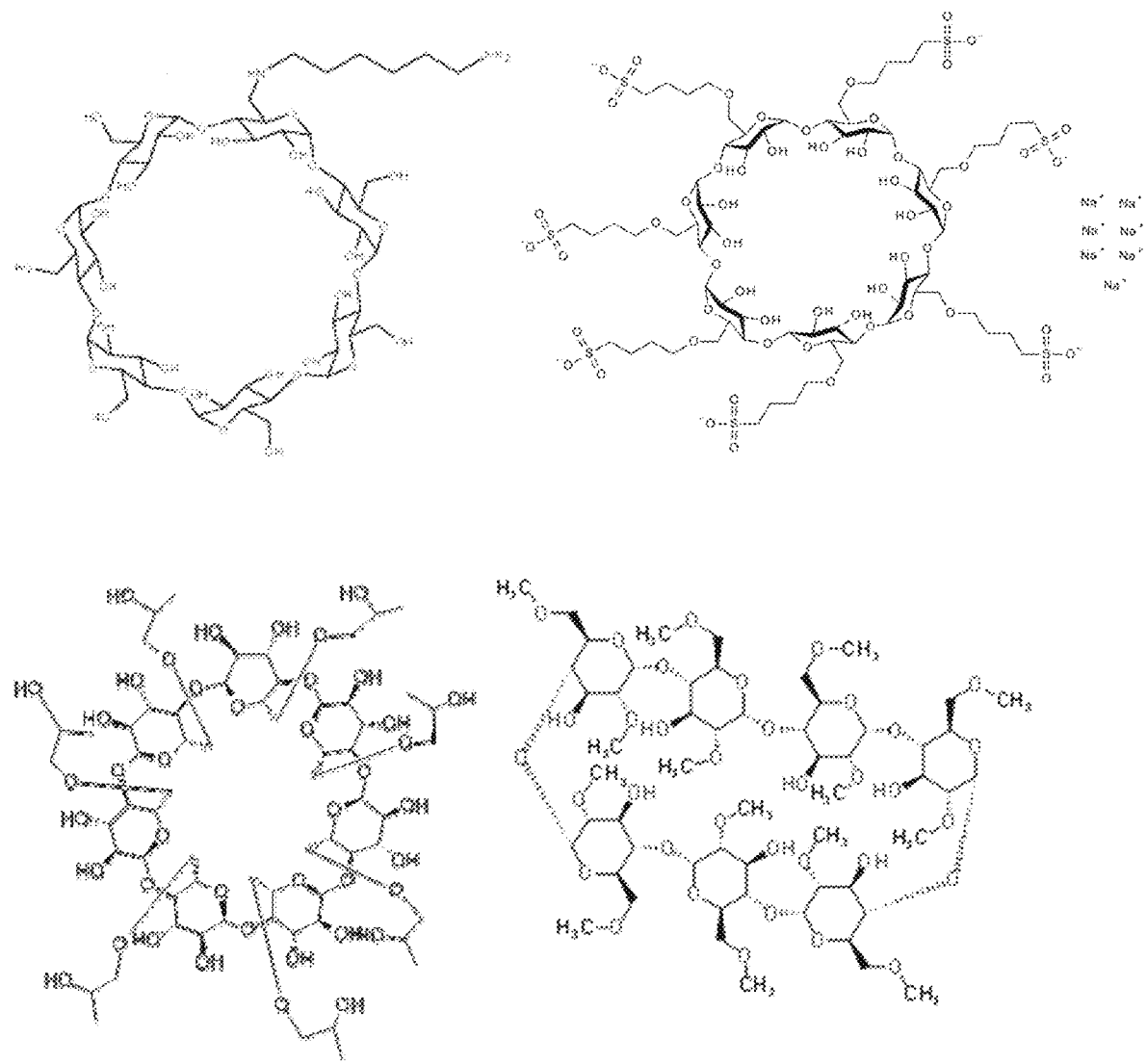
FIG. 5. Examples of partially or completely substituted or modified hydroxyl side chains of beta-cyclodextrin.

In a preferred embodiment, the β-CD is further modified by grafting (bonding) one or more functional groups to the side-chain hydroxyls of the glucoside backbone (FIG. 5). The functional groups can bond to the hydroxyl groups at, for example, the carbon positions (2), (3) or (6) of the glucose moiety. One or two or all three available side-chain hydroxyl groups may be unsubstituted or substituted. In a non-limiting variation, cyclodextrin comprises a blend of substituted, partially substituted and unsubstituted forms. The resulting grafted hydroxyl may be in the form of an ester group (e.g., by reaction with an acyl halide or other alkyl halide), an alkoxide group (e.g., by reaction with an alkali or alkaline earth base), ether group (e.g., by reaction with an alkene), cyano group. Grafting may be accomplished by electrophilic or nucleophilic substitution reactions. Furthermore, the hydroxyl can be entirely replaced by other polar and non-polar group including tosylation of the 6-hydroxyl and replacement of the readily leaving toluenesulfonyl (tosyl) group by amine, hydrazine, enamine, alcoholate, iodide and other nucleophilic moieties without limitation. In a variation, the substitution group is positively charged. The charge is produced by primary, secondary, tertiary or quaternary ammonium or phosphonium moieties, with or without surfactant activity without limitation. In a variation, the replacing groups are negatively charged groups such as carboxy, di-carboxy, malonate, oxalate, citrate, alginate, sulphate, phosphate, negatively charged surfactant without limiting.

In a still another embodiment the hydroxyl-substituting group is another cyclodextrin ring. The ring can be beta, alpha or gamma. Different hydroxyls of the primary beta ring are substituted by the same or by different cyclodextrin species, and each, in turn, can be non-substituted or substituted without limitation. The resulting structures form dimers, trimers, oligomers or multimers of cyclodextrins, with the linkers of arbitrary length or composition. The oligomers and multimers of the cyclodextrins can be linear, circular or branched. The dimers, trimers, oligomers and multimers form the complexes with graphene, where the stoichiometric ratio of the cyclodextrin species and graphene is arbitrary.

Yet another nonlimiting example is grafting of isocyanate on the glucosides and incorporation of the grafted complex in the emerging priming polyurethane film upon curing. In a variation of the embodiment, the functional groups are epoxides. In the other variations, the functional groups are linear, branched or cyclic alkanes (substituted or unsubstituted), linear, branched or cyclic alkenes (E, Z-isomers, trans-cis isomers, substituted or unsubstituted, geminal or vicinal), linear, branched or cyclic dienes (conjugated or non-conjugated, substituted or unsubstituted, geminal or vicinal, E, Z isomers), dienophiles, 1, 4-beta carbonyl systems, linear branched or cyclic alkynes (substituted or unsubstituted), substituted or unsubstituted aryls and/or heteroaryl (monocyclic or polynuclear), acryls, epoxides, diols, polyols, isocyanates, pyridines, cyanides, nitriles, iso-nitriles, amides (primary and secondary), amines (primary, secondary, tertiary and quaternary), ethers, esters, anhydrides, halides, aldehydes, ketones, carbenes, thiols, disulfides, sulfones, azides, nitrites, nitrates, oxims, imines, aldimines, ketimines, carboxyls, phosphines, siloxanes, silanes, silyls, and all other typical substituting groups known to those skilled in the art without limitation, and optical isomers, diastereomers, hydrates, polymorphs, arbitrary secondary substitutions, isotope substitutions, tautomers, conformers and salts thereof in all cases where applicable without limitation. The preferred modification is stable to hydrolysis and photolysis for at least 15 years. (See FIG. 5).

In a preferred embodiment, modified cyclodextrins are available commercially. In an nonlimiting example, CAVCON offers Hydroxypropyl Betadex, Betadex Sulfobutyl Ether Sodium, Hydroxypropyl-γ-cyclodextrin, Methyl-β-cyclodextrin, Mercapto Cyclodextrin Mono-(6-Mercapto-6-deoxy)-β-Cyclodextrin. Hexakis-(6-Mercapto-6-deoxy)-α-Cyclodextrin, Heptakis-(6-Mercapto-6-deoxy)-β-Cyclodextrin, Octakis-(6-mercapto-6-Deoxy)-γ-cyclodextrin, Iodo Cyclodextrin, Hexakis-(6-Iodo-6-Deoxy)-α-Cyclodextrin, Heptakis(6-iodo-6-deoxy)-β-cyclodextrin, Octakis-(6-Iodo-6-Deoxy)-γ-Cyclodextrin, Octakis-(6-Bromo-6-Deoxy)-γ-Cyclodextrin, Amino Beta Cyclodextrin, Mono-(6-amino-6-deoxy)-β-cyclodextrin, Heptakis(6-amino-6-deoxy)-β-cyclodextrin, Mono-(6-(diethylenetriamine)-6-deoxy)-β-Cyclodextrin, Mono-(6-((triethylenetetraamine)-6-deoxy)-β-Cyclodextrin, Mono-(6-(tetraethylenepentamine)-6-deoxy)-β-Cyclodextrin, Mono-(6-p-toluenesulfonyl)-β-cyclodextrin, Mono-(6-ethanediamine-6-deoxy)-β-Cyclodextrin, mono-(6-(1,6-hexamethylenediamine)-6-deoxy)-β-Cyclodextrin, Mono-6-azido-6-deoxy-γ-cyclodextrin, Carboxymethyl-γ-cyclodextrin. The choice of the modifiers can be improved by routine experimentation by those skilled in the art. In another embodiment, cyclodextrins are custom synthesized by CYCLOLAB. In yet another variation, the composition of the derivatizing groups is optimized by the provider, such as CAPTISOL, OBCAM, Sigma-Aldrich without limiting.

The presence of the modifiers may improve the affinity of β-CD to the graphene component and to the steel surface. The functional groups are polymerizable monomers that react with the matrix (binder) material by entraining and/or chemically bonding (e.g., covalently) the β-CD complex (in all above-described embodiments) in the matrix. In the other variations the modifying groups on the β-CD complex form the second covalent network between the individual units, enmeshed and interpenetrating with the network of the primary matrix (binder). One non-limiting example is a network of β-CD complexes grafted with acrylates interpenetrating with the basal epoxide network. Another nonlimiting example is grafting of isocyanate on the glucosides and incorporation of the grafted complex in the emerging priming polyurethane film upon curing. In a variation of the embodiment, the functional groups are epoxides. In the other variations, the functional groups are alkanes, alkenes, aryls, isocyanates, nitriles, amides, ethers, esters and all mentioned above without limitation.

In a preferred embodiment, the cyclodextrin component is modified, oligomerized or polymerized and forms a complex with graphene at the next step. The cyclodextrin rings bound by graphene or graphene-free rings form the nodes of an interpenetrating network between the cyclodextrin linkers and the basal matrix to be cured. In the presence of molar excess of cyclodextrins vs. graphene, beta cyclodextrins (less water-soluble) preferentially absorbs graphene, while more hydrophilic alpha or gamma cyclodextrin substituents linked to the beta cyclodextrin remain unbound. The polymerizable modifying groups described above and forming the substituents in alpha or gamma cyclodextrins then covalently bond the basal matrix, forming the nodes of an interpenetrating network. Due to multiple stable bonds and branching, the graphene complex is covalently anchored in the network and is resistant to hydrolysis and photolysis over multiple years of exposure of the coating to the solar radiation, diffusing salts, marine life enzymes, and microdefects.

In the preferred and non-limiting embodiment, two steps—reduction of the graphene oxide to form graphene and complex formation with a beta-cyclodextrin are combined in a single one-pot reaction. For the chemical grafting of the cycloheptaglucosan (e.g., a beta-cyclodextrin) on the prepared graphene nanosheets, graphene oxide is dispersed in water. On the other hand, cycloheptaglucosan aqueous solution is prepared under sonication at 50° C. to dissolve the cycloheptaglucosan (the concentration at saturation is 18.5 g/liter at room temperature (RT) or even higher at 50° C.). This solution then is added into the dispersed graphene under vigorous stirring (1-5 grams per liter). The purpose of stirring is to overcome the stacking and aggregation of the individual graphene monolayers. The pH of the system is controlled at 8 by adding an ammonia solution. Then, a hydrazine solution is added under stirring (reducer of graphene oxide in the graphene). The system is kept under reflux with stirring at 90° C. for 48 h and allowed to cool and filtered. At this point, the re-aggregation of graphene monolayers is prevented by its complexation by CD-G (See more reaction descriptions in the Examples below).

Figure 7:
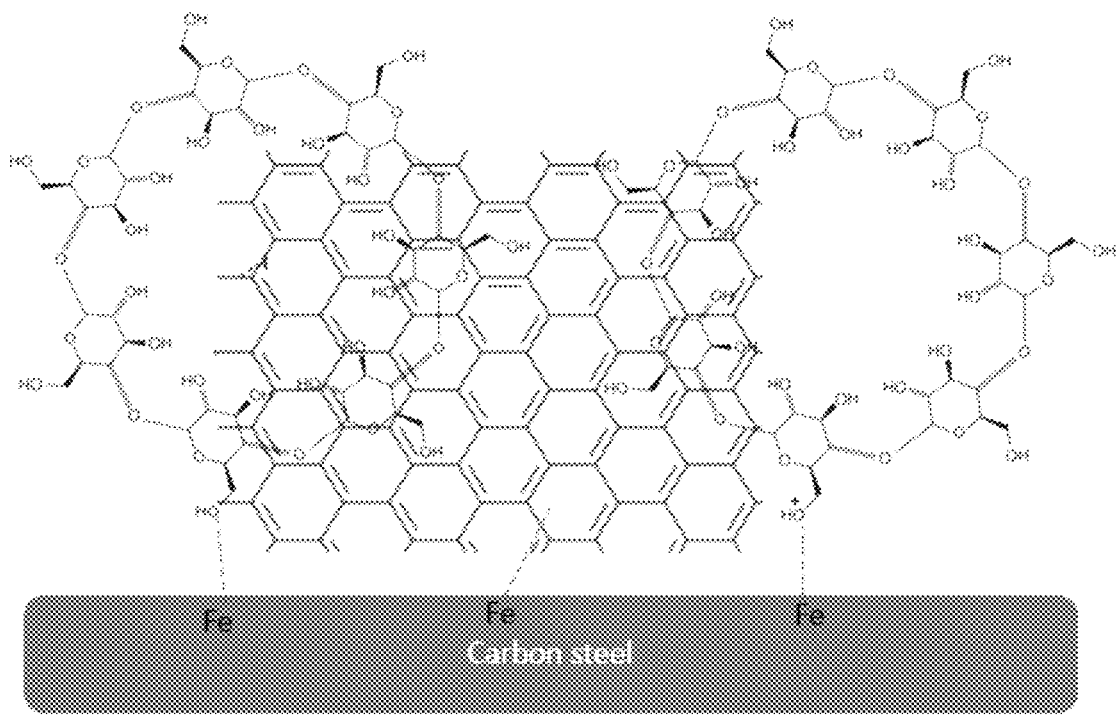
FIG. 7. A schematic illustration of the mechanism of interaction.

In a preferred embodiment, the product is validated by a combination of scanning electron microscopy (SEM) and transmission electron microscopy (TEM). The most preferred product is shown in FIG. 7, comprising a single exfoliated monolayer of graphene decorated by the adequately spaced (e.g., not interacting sterically) cyclodextrin moieties, disposed in the plane of the exfoliated graphene and providing attachment contact between the two. The co-planar orientation of the non-contacting β-CD rings on the graphene surface is termed "decorating" and characterizes a superior product, suitable for metal coating, e.g., as a part of a primer. The co-planar β-CD rings slide randomly in the graphene plane, altering the polarity of the complex from hydrophobic to amphiphilic or hydrophilic depending on the cyclodextrin to graphene ratio. Preferably, the ratio is 10:1, 8:1, 6:1, 4:1, or about 2:1 on a molar basis such that β-CD coats >50%, preferably 60%, 70%, 80% or >90% of the available graphene surface. The strength of adhesion to the metal determined by the presence of polar bonds in the contacting layer is balanced with the self-healing behavior promoted by hydrophobicity of the grafting groups.

In a non-limiting embodiment, a protected surface is carefully prepared for coating by dry abrasive blasting, washing off the dust, and degreasing. Dry abrasives used in surface prep include sand, sand substitutes, coal slag, steel grit, and garnet. Dry abrasives are sometimes combined with a sponge media to reduce dust at the site of the blasting, and the sponge media is preferably recyclable. Intense blasting is compatible with a longer lifespan of the subsequently applied coating. For marine hulls, the coating is conducted on land, prior to the assembly from the sub-parts. Smaller units are painted in the assembled state in their entirety. Dedusting is conducted by airbursts and vacuuming, degreasing of the dedusted surface is conducted using a dispersion of an organic solvent such as acetone or isopropanol, preferably in water. The solvent is rapidly removed, preventing evaporation and re-deposition of the contaminants on the metal surface. Surface roughness facilitates the adhesion of the coating and can be increased by an optional mechanical processing before cleaning (metal dust needs to be rigorously washed off due to interference with the adhesion of the coating).

In one non-limiting embodiment, the protective coating is formed by the following procedure. First, a basal coating mix is formed. For this preparation, 5 volumes of 3 an aminosilane such as aminopropyltrimethoxysilane (at 0.02-0.03 molar range) is mixed with 2 volumes of an epoxy resin such as DER732 under stirring for 30 minutes. Next, 10 volumes of a precursor alkoxy silane such as methyltrimethoxysilane (0.06-0.1 molar range) is added to the reaction mixture under stirring for 1 h. For induction of the sol-gel reactions, 0.25 volumes of an acidic aqueous alcoholic mixture such as a 0.05N $HNO_3$:isopropanol, 1:2 ratio) solution is added, and the resulting solution continued to stir for another 2 h. Finally, a diisocyanate such as isophorone diisocyanate (e.g., 2 volumes, 0.009-0.011 molar) is added gradually to the reaction mixture under stirring for 24 h. To about 4 volumes of a fresh base coating, about 1 volume of a dispersed solution of the developed graphene material in ethanol (100 ppm) is added, and the resulting solution stirred for 24 h at room temperature. The resulting coating is referred to as a "composite coating". The coating is applied by methods known to those skilled in the art (below), yielding an approximate controlled thickness of 50 µm for all coating matrices. The coated samples were optimally cured in an oven at 100° C. for 24 h.

In a preferred alternative embodiment of the method, the proportions of epoxide and aminopropyltrimethoxysilane are variable in a series of multiple thin sublayers (10 µm each), sequentially deposited and cured at 100° C. for 3 h each. Since the metal and the coating may expand differentially, the cracks and micro-defects forming in the weak points of the first layer are healed by the second deposition and curing cycle. The deepest layer (close to the metal) is the most elastic, and the outermost layer is the most rigid and non-permeable. Different proportions in the sub-layers (e.g., intermediate layers) ensure that under the conditions when one sub-layer cracks and the coating partially loses integrity, the other layers remain protective. Also, thinner sublayers are more elastic on a relative basis. In a variation of this method, a cooling cycle is introduced after each curing cycle by blowing evaporated liquid nitrogen to ensure that the additional weak points are exposed and healed by subsequent depositions. In each deposition step, graphene flakes diffuse from the fresh liquid into micro-defects, and 1-2 hours of exposure at room temperature before higher temperature curing facilitates this exfoliation and diffusion process before forming the rigid post-curing network. In another variation, vibration comparable in frequency and amplitude to the future typical vibration of the moving metal structure is applied and produces local micro-defects to be healed by the next deposition. The last coating is preferably conducted by the standard method without temperature swings or imposed vibration.

The rationale for deliberately re-stressing the coating is that the future cracks initiate in the points of strain accumulation, and such points manifest during the formative stage. Broadening the dynamic range of the strain due to temperature variations and vibration in the coating and the adjacent metal layer accomplishes the stressing. Once the defects form, they are immediately healed by the next cycle, while the formation of the defects releases the original strain. The embodiment is labor-intensive and more expensive, yet it provides a superior, long-lasting coating, especially when combined with the green anti-foaling steps and other integrated green approaches to corrosion prevention (below). The economic effect of longer un-interrupted and fuel-conserving exploitation of a high tonnage vessel offsets the additional expense many-fold (economic analysis below). Likewise, many metal parts of construction and machinery outside of the marine field are mission-critical and are hard to access in an assembled state; thus, the more efficient corrosion prevention by a robust stress-fortified coating is economical (oil rigs, fracturing equipment, shale extractions). The alternative, not stress-fortified solutions are considered below and are also applicable to other metals of marine and general industrial importance such as aluminum alloys, magnesium alloys, titanium alloys, copper alloys, especially under the conditions of extended exposure to the elements and salinity.

In another preferred embodiment, magnesium powder is incorporated in the epoxide matrix (together with the inventive CD-G complex) to replace zinc powder typically used in such applications as a sacrificial galvanic pair cathode. Pure magnesium, without Al, Ni, or Zn ingredient release only $MgCl_2$, $Mg(OH)_2$ or $MgSO_4$ corrosion products, each non-toxic and "green", since ocean water already comprises 0.0528 moles/kg of Mg+2 (See DOE, In A. G. Dickson & C. Goyet (eds.). *Handbook of methods for the analysis of the various parameters of the carbon dioxide system in seawater*, 1994, 2, ORNL/CDIAC-74, incorporated herein by reference in entirety).

The other preferred embodiment is the use of different resins in different sub-layers, and the laminate coating builds as follows for example: [CD-G–epoxide–silane (e.g., primer)]–[CD-G–epoxide–acrylate]–[CD-G–polyurethane]. Such a laminate coating provides even greater robustness in more diverse conditions and temperature ranges. The epoxides in the primer layer or in the first outside layer next to the primer are hydrophobically modified to ensure self-healing by graphene exfoliation, thermodynamically driven by the prevailing hydrophobicity of the epoxy matrix.

Plasticizers and bacteriostatic ingredients, as well as inhibitors of weed/biofilm/barnacle overgrowth, are preferably incorporated to extend the life cycle of the coating. In the non-green compositions of the prior art, such functions were performed by the addition of organotin (e.g., TBT), copper or corrosion of sacrificial Zn cathodes, thereby releasing toxic ions inhibiting undesired growth of marine life and, disadvantageously, together with the economically important species. Accumulation of toxic metal ions in the food chain ultimately reaches human consumers and the increased healthcare costs provide a strong motivation to shift to greener antifouling protection. However, non-toxic approaches are less efficient. In a green application, marine overgrowth can become a problematic development, increasing fuel consumption by the vessel. Attempts to remove attached growth mechanically, sonically, electrically or thermally can damage the coating and lead to corrosion. Thus, incorporation of an antifouling layer in the laminate is preferred, wherein the laminate includes an inner CD-G coating layer (e.g., the layer nearest to the metal surface) and an outer anti-foaling layer. There are four main categories of tin-free antifouling paints used to form such anti-foaling layers:

Controlled Depletion Polymer (CDP) Paint.

Due to the rosin content, dissolution is slow, similar to soap dissolution in water, which is slightly soluble in water. CDP incorporates higher levels of copper and biocides. The biocides escape by diffusion; the dissolution gradually slows due to a leached layer formed by insoluble materials at the surface. The roughness of the hull surface and fuel consumption increases as time passes. The coating is efficient but is not sufficiently "green".

Hybrid TBT (Organotin) Free Paint.

By carefully combining Copper Acrylate coating with Rosin based CDP technology, it has been possible to form a hybrid. The hybrid is an antifouling coating that has the CDP features of surface tolerance and attractive volume solids, control of biocide release, and reduced leached layer size. Since CDP and Hybrid antifouling paints are typically not designed for more than 36 months in-service on the vertical sides of a vessel, the power/fuel penalty for these products rises sharply after three years.

Self-Polishing Copolymer (SPC) Paint.

SPC is a self-polishing paint that matches the performance of traditional TBT-based coatings as it is based on a chemical reaction between water and the coating. The service life of SPC is up to five years but it costs 2-3 times more than CDP paints. SPC contains smaller amounts of biocides than CDP and is also less toxic. The base is copper as in CDP, but the amount needed is only 60-70% in comparison to that of CDP. The other biocide used in SPC is zinc pyrithione. The function is based on a chemical reaction with water (hydrolysis), liberating $Zn^{+2}$ ins which are toxic for marine overgrowth. SPC has a more controlled leakage of biocides over time, which reduces the risk of fouling. However, the release of zinc is "non-green".

Fouling Release Paint.

Fouling release is an antifouling paint, which is free from biocides. It is normally silicone-based and leaves a non-stick surface. The efficacy is dependent on the speed of the vessel, as any attached fouling may wash off. Moreover, the price is a disadvantage since it is 5 times more expensive per liter than others. However, as evaluations on expected service life continue; and if the Fouling Release coating is intact, no recoating is needed for several years, which in turn reduces costs. This paint is one of the best choices when it comes to environmental impact as it contains no biocides. The effect is based on a smooth surface that prevents marine organisms from attaching. When the vessel increases speed, the organisms fall off (See the online material M. BADER-ELDIN with College of Maritime Transport and Technology Arab Academy for Science and Technology and Maritime Transport, titled "Hull roughness and antifouling paint", incorporating herein by reference in entirety). Fouling release paint with the addition of microquantities of colloid silver is the preferred non-limiting embodiment, combining antifouling and local microbicidal effects.

Green fouling release exterior paintings are exemplified without limitation by the products of PPG Protective & Marine Coatings, Hempel, Fujifilm, Akzo-Nobel (fluoropolymer-based fouling release), Silicone Solutions, European Coating, MPI Release, Seacost Technology. The additional embodiments are incorporated herein by reference in entirety (see M. Lejars, A. Margaillan, C. Bressy, *Chemical reviews*. 2012, 112(8), 4347-90; US20180163087; E. R. Silva, O. Ferreira, P. A. Ramalho, N. F. Azevedo, R. Bayern, A. Igartua, J. C. Bordado, M. J. Calhorda, *Science of the Total Environment*, 2019, v. 650, pp 2499-511; M. S. Selim; M. A. Shenashen; S. A. El-Safty; S. A. Higazy; M. M. Selim; H. Isago; A. Elmarakbi, *Progress in Materials Science*, 2017, v. 87, pp. 1-32).

The applied anti-corrosive coating must be characterized and assessed by the existing ASTM correlating with the duration of the protective effect. Paint standards and related coating standards are presented by ASTM INTERNATIONAL. Table 1 of the standards guiding durability of the coatings on the hulls of maritime vessels is provided as a non-limiting embodiment.

TABLE 1

ASTM covering antifouling of marine coatings

| Designation | Title |
| --- | --- |
| D3623-78a(2012) | Standard Test Method for Testing Antifouling Panels in Shallow Submergence |
| D4938-89(2013) | Standard Test Method for Erosion Testing of Antifouling Paints Using High Velocity Water |
| D4939-89(2013) | Standard Test Method for Subjecting Marine Antifouling Coating to Biofouling and Fluid Shear Forces in Natural Seawater |
| D5063-90(2012) | Standard Guide for Use of Certification of Coating Conformance Form |
| D5479-94(2013) | Standard Practice for Testing Biofouling Resistance of Marine Coatings Partially Immersed |
| D5618-94(2011) | Standard Test Method for Measurement of Barnacle Adhesion Strength in Shear |
| D6442-06(2012) | Standard Test Method for Determination of Copper Release Rate From Antifouling Coatings in Substitute Ocean Water |
| D6903-07(2013) | Standard Test Method for Determination of Organic Biocide Release Rate From Antifouling Coatings in Substitute Ocean Water |
| D6990-05(2011) | Standard Practice for Evaluating Biofouling Resistance and Physical Performance of Marine Coating Systems |

In another non-limiting and preferred embodiment, Table 2 describes ASTM standards addressing physical properties of applied paint films.

TABLE 2

Physical properties of the applied paint films

| Designation | Title |
|---|---|
| D522/ D522M-17 | Standard Test Methods for Mandrel Bend Test of Attached Organic Coatings |
| D823-18 | Standard Practices for Producing Films of Uniform Thickness of Paint, Coatings and Related Products on Test Panels |
| D968-17 | Standard Test Methods for Abrasion Resistance of Organic Coatings by Falling Abrasive |
| D1005-95(2013) | Standard Test Method for Measurement of Dry-Film Thickness of Organic Coatings Using Micrometers |
| D1212-91(2013) | Standard Test Methods for Measurement of Wet Film Thickness of Organic Coatings |
| D1474/ D1474M-13(2018) | Standard Test Methods for Indentation Hardness of Organic Coatings |
| D1640/ D1640M-14(2018) | Standard Test Methods for Drying, Curing, or Film Formation of Organic Coatings |
| D1653-13 | Standard Test Methods for Water Vapor Transmission of Organic Coating Films |
| D2134-93(2012) | Standard Test Method for Determining the Hardness of Organic Coatings with a Sward-Type Hardness Rocker |
| D2197-16 | Standard Test Method for Adhesion of Organic Coatings by Scrape Adhesion |
| D2370-16 | Standard Test Method for Tensile Properties of Organic Coatings |
| D2794-93(2019) | Standard Test Method for Resistance of Organic Coatings to the Effects of Rapid Deformation (Impact) |
| D3359-17 | Standard Test Methods for Rating Adhesion by Tape Test |
| D3363-05(2011)e2 | Standard Test Method for Film Hardness by Pencil Test |
| D4060-19 | Standard Test Method for Abrasion Resistance of Organic Coatings by the Taber Abraser |
| D4138-07a(2017) | Standard Practices for Measurement of Dry Film Thickness of Protective Coating Systems by Destructive, Cross-Sectioning Means |
| D4366-16 | Standard Test Methods for Hardness of Organic Coatings by Pendulum Damping Tests |
| D4414-95(2013) | Standard Practice for Measurement of Wet Film Thickness by Notch Gages |
| D4708-19 | Standard Practice for Preparation of Uniform Free Films of Organic Coatings |
| D5178-16 | Standard Test Method for Mar Resistance of Organic Coatings |
| D5179-16 | Standard Test Method for Measuring Adhesion of Organic Coatings in the Laboratory by Direct Tensile Method |
| D5895-13 | Standard Test Methods for Evaluating Drying or Curing During Film Formation of Organic Coatings Using Mechanical Recorders |
| D6037-18 | Standard Test Methods for Dry Abrasion Mar Resistance of High Gloss Coatings |
| D6132-13(2017) | Standard Test Method for Nondestructive Measurement of Dry Film Thickness of Applied Organic Coatings Using an Ultrasonic Coating Thickness Gage |
| D6905-03(2012) | Standard Test Method for Impact Flexibility of Organic Coatings |
| D6991-17e1 | Standard Test Method for Measurements of Internal Stresses in Organic Coatings by Cantilever (Beam) Method |
| D7091-13 | Standard Practice for Nondestructive Measurement of Dry Film Thickness of Nonmagnetic Coatings Applied to Ferrous Metals and Nonmagnetic, Nonconductive Coatings Applied to Non-Ferrous Metals |
| D7187-15 | Standard Test Method for Measuring Mechanistic Aspects of Scratch/Mar Behavior of Paint Coatings by Nanoscratching |
| D7334-08(2013) | Standard Practice for Surface Wettability of Coatings, Substrates and Pigments by Advancing Contact Angle Measurement |
| D7490-13 | Standard Test Method for Measurement of the Surface Tension of Solid Coatings, Substrates and Pigments using Contact Angle Measurements |
| D7541-11(2015) | Standard Practice for Estimating Critical Surface Tensions |

In a preferred embodiment, the correspondence between Tables 1 and 2 and the properties of the coating is achieved by following the guidelines provided in the respective standards.

In the preferred and non-limiting embodiment, the method of surface coating constitutes a sub-method of an integrated corrosion-protection system and method. The advantage of an integrated approach stems from the disparity in the scale of the metal losses due to corrosion and the low expenses preventing the said losses by applying multiple mutually reinforcing methodologies of corrosion prevention. According to SteelConstruction.info data (last accessed Nov. 29, 2019), Table 3 below illustrates the rate of metal losses under different conditions.

TABLE 3

The annual losses of construction steel under the different exploitation environments (EN ISO 9223, EN ISO 12944-2 standards).

| Corrosivity category | Low-carbon steel Thickness loss $(\mu m)^a$ | Examples of typical environments | |
|---|---|---|---|
| | | Exterior | Interior |
| C1 very low | ≤1.3 | — | Heated buildings with clean atmospheres, e.g. offices, shops, schools, hotels |
| C2 low | >1.3 to 25 | Atmospheres with low level of pollution: mostly rural areas | Unheated buildings where condensation can occur, e.g. depots, sports halls |
| C3 medium | >25 to 50 | Urban and industrial atmospheres, moderate sulphur dioxide pollution; coastal area with low salinity | Production rooms with high humidity and some air pollution, e.g. food-processing plants, laundries, breweries, dairies |
| C4 high | >50 to 80 | Industrial areas and coastal areas with moderate salinity | Chemical plants, swimming pools, coastal ship and boatyards |
| C5 very high | >80 to 200 | Industrial areas with high humidity and aggressive atmosphere and coastal areas with high salinity | Buildings or areas with almost permanent condensation and high pollution |
| CX extreme | >200 to 700 | Offshore areas with high salinity and industrial areas with extreme humidity and aggressive atmosphere and sub-tropical and tropical atmospheres | Industrial areas with extreme humidity and aggressive atmosphere |

In preferred and non-limiting embodiments, integrated systems of corrosion protection can be applied with the painting as a component. The integrated system of corrosion control combines the technical approach, which includes coating, cathodic protection, and inhibitors with a managerial approach. Management includes exploitation regime, inspection regime, choice of metal for construction, scheduling of the protective measures, the awareness of and avoidance of galvanic (welding induced), stray current (protective cathode-induced), microbially-induced, crevice, cavitation-induced, erosion-induced subtypes of corrosion. In a variation of the embodiment, welding regions need to be especially carefully inspected, to discover the coating defects.

Another component of the integrated corrosion-protection system is the impressed current cathodic protection, that utilizes an external power source (usually AC to DC) to provide a potential difference between the anode(s) and the protected structure. Anodes are connected to the (+) positive terminal of the power source, while the protected structure connects to the (−) negative terminal of the power source. The choice of the potentials and the current strength must be selected empirically, and the sacrificial anode (magnesium alloy) needs regular inspections. The method is complicated by stray currents, which run between the cathode and the anodes forming in the protected metal itself if the sacrificial anode is exhausted, however, the external voltage is still present, or when the sacrificial anode is misplaced.

In a non-limiting embodiment, the magnesium-carrying resin layer is external to the interior hydrophobically derivatized self-healing CD-G primer, further followed by the outermost fouling release layer. The laminate provides the triple "green" corrosion prevention by the barrier, defect healing, electrochemical, and antifouling mechanisms, integrated in a single coating. The polymer coating layer carrying the active metal particles is a time-tested arrangement for corrosion protection in challenging environments (epoxy zinc used in steel bridges). Metalized resin coatings obviate the need in impressed current solutions or in massive sacrificial anodes and the associated corrosion risks.

Use of Mg-PR coating (magnesium-rich primers) is suitable for steels (See S. S. Pathak, S. K. Mendon, M. D. Blanton, J. W. Rawlins, *Metals.* 2012, v.; 2(3), pp 353-76; U.S. Pat. No. 4,083,726; WO2005051551; J. Lin, C. Orgon, D. Battocchi, G. P. Bierwagen, *Progress in Organic Coatings,* 2017, v, 102, pp. 138-43; J. R. Xavier, T. Nishimura, *Journal of Coatings Technology and Research.* 2017, v. 14(2), pp 395-406, incorporated herein by reference in entirety). Mg-RPs are available commercially from AkzoNobel as Aerodur 2100 Mg-RP, corrosion inhibiting epoxy-modified polyamide primer. A magnesium-rich coating meeting the AMS 3095A and military specifications, Aerodur 2100 MgRP has exceptional performance in corrosion protection, outperforming chromated systems, and is applied preferably to aluminum alloys. The applications of Mg-PRs to steels are also known, although are less time-tested and may be less reliable. In a variation of this embodiment, the magnesium powder adds to the first CD-G primer layer, wherein the steel, graphene, and magnesium are all coupled electronically and at the same time are insulated from the corrosive environment by the outermost layers, for example by an intermediate epoxide topped by a sealant and by the siloxane antifouling film of the Example 6 below.

Intrinsically conducting polymer "green" coating systems for corrosion protection of structural steels form the alternatives to zinc epoxides. In the non-limiting preferred embodiment, the CD-G layer incorporates polymeric polyaniline (PANT). Polyaniline, when mixed in polyvinyl-butyral and top-coated with an acrylic resin layer, demonstrates comparable performance to the existing coating systems by the ASTM standard tests evaluating corrosion durability and tensile adhesion (pull-off strength). The polyaniline-based primer demonstrates potential surface ennobling and oxygen smearing-out capabilities. The layered structure, including the PANI primer constitutes a viable smart coating system for environmentally-friendly corrosion protection of metallic materials The intrinsically conductive polymer forms a conjugated π-orbital overlap with the graphene particles and serves as an electron donor similarly to zinc or magnesium metals (in case of steels, the conductive polymers have lower electrochemical potentials and are reducers). Unlike zinc or TBT tin, the PANI is entrapped in the polymer network and is unlikely to leak in the environment and accumulate in human-consumable food chains.

In the other preferred and non-limiting embodiment, polypyrrole (PPy) composite coatings are effectively synthesized in the presence of $TiO_2$ and V—$TiO_2$ nanoparticles on carbon steel by electrochemical method in aqueous oxalic acid solutions. Results show that the V—$TiO_2$/PPy composite coatings exhibit better anti-corrosion performance than $TiO_2$/PPy composite coatings in 0.1 M HCl, a very aggressive environment for steels. The exceptional anti-corrosion performance of PPy composite coatings is associated with the synergistic effect of the increase in the physical barrier, prevention of charge transport by $TiO_2$ nanoparticles, and the complex passive film on the metal surface. In a variation of this embodiment, oxidative polymerization of aniline (AN) and o-toluidine (OT) for the synthesis of copolymer, poly(AN-co-OT) and its composite with $TiO_2$ nanoparticles, employing ammonium persulfate as an oxidant and HCl as an external dopant is carried out. The homopolymers, polyaniline, and poly(o-toluidine) are also prepared by following a similar method. The anticorrosive coatings are synthesized in dimethyl sulfoxide solution by dissolving synthesized polymers, and then applied on low-carbon steel (LCS) samples using epoxy binder. The anticorrosive potential of the polymer coatings containing copolymer, copolymer-nanocomposite, and homopolymers on LCS is evaluated in 3.5% NaCl at a temperature of 30° C. The nanocomposite coating (including $TiO_2$) increases the protection efficacy by providing better barrier properties against corrosion as compared with neat copolymer and homopolymers coatings (without $TiO_2$).

In a more preferred embodiment, a four-layer anti-corrosion and antifouling composite incorporates a [CD-G-Zn metal-hydrophobically-modified epoxy resin] as a primer, a siloxane sealant as an intermediate layer, polyurethane layer, and the fouling release layer. The sealant, polyurethane, and fouling release layers limit the diffusion of the corroded zinc ions out of the protecting primer, while CD-G-modified epoxy delays the overall corrosion process and ensures self-healing in the primer, delaying the chemical conversion of zinc. The products of SilicoTek (SilcoNert®, Dursan®, Silcolloy®, SilcoKlean®, SilcoGuard®, Dursox®), Sauereisen coatings, Denso North America marine sealing products exemplify the steel-protecting sealants without limiting. The polyurethane and sealant layers incorporate Zn-chelating polymers, intercepting the diffusing ions in-situ. Such environmentally protective heavy-metal chelating polymers are illustrated by U.S. Ser. No. 10/343,143, Z. Xia, S. Zhang, Y. Cao, Q, Zhong, G. Wang, T. Li, X. Xu, *Journal of hazardous materials*, 2019, v. 366, pp 177-83; L. Sartore, K. Dey, *Advances in Materials Science and Engineering*, 2019; incorporated herein by reference in entirety. This especially preferred embodiment is particularly long-lasting due to the time-tested low corrosion rate of zinc-protected steel structures and the diversified, hermetic, and laminated structure of the coating. At the same time, the embodiment is green over a shorter (<10-15 years) terms of service assuming the mechanical integrity of the films is preserved, since the concentration and localization of chelators are selected such that <1% of the corroded zinc escapes in the environment.

While the laminated paint and especially stress-fortified variations require additional labor and multiplied costs, these costs exist in the context of the economic effects delivered by the superior innovating coating schemes and subsequent improved management. With the multiple layers, the probability of scratching or peeling exposing the vulnerable metal surface is reduced. The integrated coating allows for the use of cheaper steels for the vessel construction, while the choice of metal remains in the acceptable range for the given application. When a metal is exposed to underwater or wet environments, selecting marine grade metals is necessary (and government-mandated) to prevent the material from failing under the conditions of exploitation. To be considered a marine-grade metal, the material must be able to resist the corrosive effects that are common in the ocean environment, such as salty water dust. Special alloying components are added to these grades for inherent protection against corrosion. The alloying profile determines the costs and produces the economic fundamentals to consider when applying the methods of this invention.

Below, such analysis is exemplified without limitation. Most carbon steels are not well-suited for marine environments; however, several marine-grade carbon steels are available. AH36, DH36, and EH36 are all examples of commonly used marine-grade carbon steels approved by the American Bureau of Shipping. These grades have more alloying elements such as manganese and chromium compared to their non-marine counterparts, which helps achieve higher strength and more corrosion resistance. There are also marine grades of alloy steel. Grades MD, ME, MF, MG can provide the strength that normal alloy steel is known for and have also been approved by the American Bureau of Shipping for use in shipbuilding applications.

There are several different grades of aluminum that are suitable for marine conditions. Marine-grade aluminum, for the most part, is limited to the 5XXX and 6XXX grades. Grade 5052 is excellent when formability is required. If strength is more of a concern, grade 5083 is a good alternative. 6061-T6 is an all-purpose grade of aluminum that is also commonly used in marine applications. It has excellent corrosion resistance and is precipitation hardened. These grades, for the most part, have additional chromium and manganese to help protect them from corrosive marine conditions.

All grades of stainless steel have some degree of corrosion resistance; however, there are several that are far more suitable for use in marine environments. Grade 316 is the most common grade of stainless steel used in marine applications. It has more molybdenum than other austenitic stainless steels, which helps it to resist pitting and other corrosive effects of salt-water. Grade 304 is another marine grade stainless steel, although it has less molybdenum than grade 316, making it a less desirable choice in chlorine-rich environments. Due to higher costs, these steels usually find applications as marine fittings, marine fasteners, and marine structures.

There are several copper-nickel alloys suitable for marine applications. Examples include C70600, which contains nickel and manganese to help resist corrosion. C71500 is also able to withstand marine conditions, which has a similar makeup to alloy C70600, except that it has even more nickel in its chemical composition. Applications: water lines, desalination equipment, marine fittings, fasteners, valves, and pumps. Silicon bronze alloys like C65500 and aluminum bronze alloys like C95400 are developed to withstand marine environments better than other bronze alloys. Alternatively, the phosphor bronze alloy C51000 is another common grade suitable for marine applications. Marine brass or naval brass comes in a variety of alloys. Alloys C46200 and C46400 have additions of zinc and tin, that allow the brass alloy to resist corrosion in wet or even underwater applications. Alloys C48200 and C48500 are similar except that they have a larger amount of lead in their chemical composition. Applications: pipes, marine fittings, marine fasteners, and pumps.

The mass of the material comprising a vessel can be computed as a difference between the total water displacement and Dead Weight Tonnage (DWT) and is reported as Light Displacement (LDT). The LDT metric is the weight of the ship, excluding cargo, fuel, water, ballast, stores, passengers, crew, but with water in boilers. For a modern ship, the following relative tonnage figures would ordinarily be approximately correct: Net tonnage 4,000; Gross tonnage 6,000; Deadweight carrying capacity 10,000; Displacement, loaded, about 13,350. The approximate ratio of 3:1 is between DWT and Net Weight. Thus, the weight of steel for a supertanker with DWT=550000 tons is in the range 1 to $1.5 \times 100000$ tons. At the market prices of about ~$1/kg of carbon steel, the cost of material is at the order of $100,000,000 for a supertanker or a comparable installation. The price of stainless steel is in the range of $2.2-3.5/kg. The choice of a more expensive metal that is inherently corrosion-resistant will add ~$200,000,000 to the cost of materials at this building scale (See MetalMiner North American Carbon Steel Price Index; MetalMiner North American Stainless Steel Price Index; M. Leal in the article titled "*Hull manufacturing cost structure*", in *Brodogradnja*, 2017, v. 68(3), pp 1-24, incorporated herein by reference in entirety).

The possibility of applying more economical material and of yet longer exploitation of the marine construct opens with the integrated all-in-one laminate coatings of this invention.

All advantages described herein depend on green methods, especially relevant for the congested sea lanes experiencing intensive international traffic or for the drilling offshore installations. The safety of LNG docking ports also depends on the structural integrity of the metal constructs, which is inversely proportional to the corrosion rates.

To fully appreciate the scope of the invention, it is known to those skilled in the art that the factors impacting ship performance are synergistic. For example, fouling would force a mechanical treatment of the hull while damaging the anti-corrosive layer. The sites of corrosion would evolve iron ions (in the absence of TBT, Cu, or Zn biocides) stimulating biofilms and the attachment of the organisms feeding on bacteria, increasing drag. The lower speed due to the higher drag and fuel consumption would force the longer transits and longer exposure to corrosive environments. (See A. Lindholdt, K. Dam-Johansen, S, M. Olsen, D. M. Yebra, S. Kiil, *Journal of Coatings Technology and Research*. 2015, v. 12(3), pp, 415-44, incorporated herein by reference in entirety).

The costs of coating per a layer and per a square foot of steel is provided in the online document titled "*Expected service life and cost considerations for maintenance and new construction protective coating work*" co-authored by J. L. Helsel, M. F. Melampy, K. Wissmar for NACE Corrosion 2008, paper #08279 incorporated herein by reference in entirety. Table 1 of this source presents the protective coatings with two or three sub-layer structure and serving from 2 to 22 years in the saline environment. The most efficient laminates incorporate polyurethane, sealant, and zinc metal in the primer. Zinc is much more corrosion-stable than steel in the saline environment, and its presence is beneficial from a corrosion protection perspective. Blasting the surface by the abrasives at the preparation step extends the coating and the metal surface life vs. hand preparation. Hard blasting, zinc primer, followed by an intermediate sealer layer and the polyurethane topcoat, provides a 22-year lifespan to the painted parts. In green modification, suitable for this invention, the polyurethane layer is filled with the zinc-intercepting chelator, which can also be a part of the primer. Adding the antifouling layer is expected to extend the protection even more.

The shop costs of coating are listed in the Tables 2-4 of Helsel et al. and are in the range 30-40 cents/ft$^2$ per a single run, the costs of surface blasting are $0.6-4 per ft$^2$, structure multiplier factor 1.5-2.0, the costs of cleaning are $0.5-2 per ft$^2$. Table 4 below presents the total costs of coating for C5 high salinity environment.

TABLE 4

Economic Analysis Worksheet, Total Painting Cost Per Sq. Ft. for 45-YearField Application, Three-Coat Inorganic Zinc/Epoxy/Polyurethane, SP6, 15 Year System Life (Severe/C5-I), incorporated from Helsel et al.

| | Painting Operation | | | | | |
|---|---|---|---|---|---|---|
| | Original Painting | Touch-Up Year 15 | Repaint Year 20 | Repaint Year 28 | Touch-Up Year 43 | Totals |
| Cost in Current $'s | $3.18 | $1.27 | $2.23 | $ 4.29 | $1.27 | $12.24 |
| NFV costs Future value @ 3% inflation | $3.18 | $2.29 | $4.88 | $12.87 | $6.87 | $30.09 |
| NPV costs Present value @ 7% interest | $3.18 | $0.83 | $1.26 | $ 1.94 | $0.37 | $ 7.58 |

With 100-250 ft$^2$ per a ton of weight (See Helsel et al.), the costs of painting and touch-up by a laminate are in the range ~$(100-250) \times (4-5) \times (100000-150000)$ $10^8$ per a super-tanker. While being a substantial investment jn coating, with the costs further ballooning, according to Table 4, the investment allows for the safe, uninterrupted function of the ship over multiple years. After paying daily amortization, fuel, exploitation and salary costs, the VLCC-class (180000 to 320000 DWT) ship owners can expect the profits of at least $60,000 a day and for the ultratanker of this calculation $120000 a day (See online materials by A. Parker, titled "*The business of oil tankers*", accessed November 2019; S. Robert, *Strauss Center for International Security and Law. University of Texas at Austin*, titled "Tankers.", WayBack Machine, accessed November 2019; W. Robert, *Financial Times*, titled "*Frontline hit by falling charter rates.*", Wayback Machine, accessed November 2019, incorporated herein by reference in entirety). That profit varies depending on several factors, including tanker availability and the strength of the oil market, yet assuming all management issues are in the optimal range, 15 years of exploitation leads to a profit of ~$1.2 \times 10^5 \times 300 \times 15 = \$6 \times 10^8$, or ROI~3.

An alternative way to estimate the service profit per year is to assume the distance of 10000 km between the supplier and consumer (i.e. Middle East-Europe, USA-Japan) and ~20 km/hour average speed. At this assumption, a one-way delivery takes 500 hours or ~20 days, ~15 days filling and unloading, and ~15-day return trip. A 50-day delivery cycle allows for seven cycles per year, carrying 500000 tons of cargo by the ULCC tanker of this analysis per a cycle and $3.5 \times 10^6$ tons per a year. Considering that ~9 barrels are in a metric ton and assuming the price of $50 per barrel, the monetary value of the cargo is $\$18 \times 10^9$ per 15 years of stable exploitation (gross revenue). According to the online tool Cost-Finder, the costs of oil delivery by tankers reach $1.00/barrel/1000 mi. after including all expenses, or ~$6.00/barrel per a charter on the route of 10000 km. The value $2.2 \times 10^9$ per 15 years of stable exploitation corresponds to ROI~11-fold for the ULCC tanker price, assumed to be $ $0.2 \times 10^9$. This gross value is theoretical and includes the amortization, maintenance, fuel and crew salary costs (25-30% of the gross value), but excludes non-use and competition for chartering. The resulting realistic value is ~$\$1.0 \times 10^9$ profit per 15 years of well-managed exploitation at 50% chartering rate, with the preferred chartering awarded to the most sea-worthy ships, winning in competition and reputation.

The profit offsets the cost of building the supertanker (~$200 million) within 3-5 years. With the daily maintenance and exploitation costs in the range ~USD 20000-25000 for the ULCC category, the initial investment is a relatively minor factor in the overall balance. With the maintenance costs ballooning with the inflation rate (Table 4), the consistent and extended term of use with the inflation-adjusted profit cash flow is the primary determinant of the return-on-investment (ROI). The investment in higher-grade steels and in superior coatings translates into the lower maintenance costs, and minimized re-painting, a difficult procedure for high-tonnage ships. The reliability of painting minimizes steel replacement in the corroded sections, maximizes operation time, chartering rate, maximizes the speed and minimizes fuel consumption by decreasing surface roughness. Improved corrosion control minimizes the probability of corrosion-related mechanical failures and the associated liabilities. Alternatively, missing the days of exploitation due to the need of maintenance, higher maintenance costs, and shorter lifespan of the construct characterize the choice of cheaper materials and inferior coating. Similar analyses can be extended beyond maritime traffic.

To conclude, the addition of the CD-G complex in the paint increases the total coating costs by a negligible fraction, but leads to a disproportional economic effect, underlining the value of the current invention. Furthermore, the improvements in the quality and characterization of the CD-G product itself produce the leveraged economic effects.

The non-limiting examples below illustrate the specific details of conducting the present inventive method.

Example 1: Graphene Characterization

The developed graphene coating additive was characterized by TEM, UV-Vis absorption, and FTIR techniques. The chemical structure of prepared graphene consists of benzene rings containing π-electrons, which displays a UV-vis absorption peak at 230 nm (FIG. 1). Raman spectroscopy is a technique for analyzing the crystalline structures of carbon materials, such as prepared graphene. The Raman spectrum of graphene oxide indicates two characteristic peaks; one that has an in-phase vibration (G band) of graphene at 1580 nm, and the other one is the disorder band (D-band) of prepared graphene at 1350 nm. FT-IR analysis was employed to confirm the chemical structure of graphene.

Figure 2:
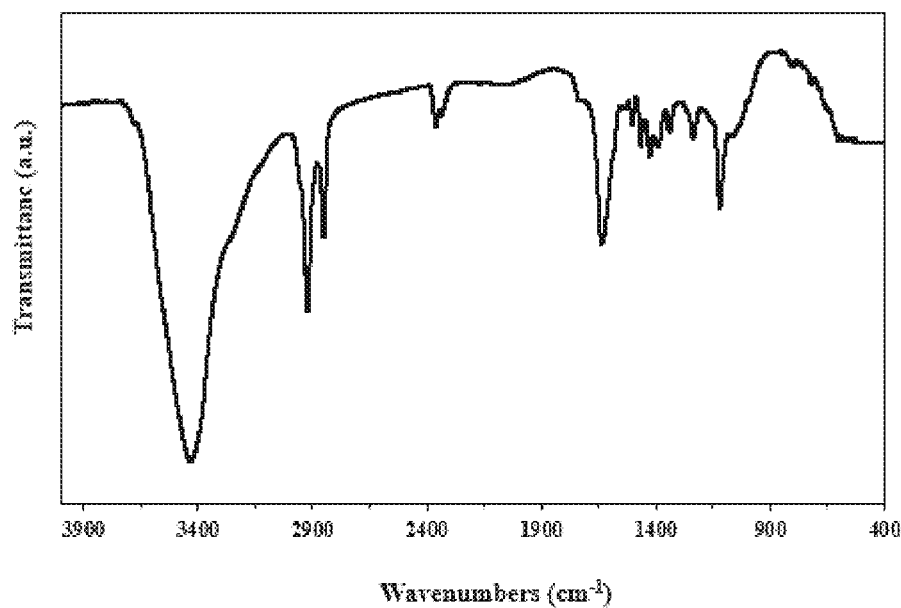
FIG. 2. FT-IR spectra of the prepared graphene.

FIG. 2 shows the FT-IR spectra of graphene. The FT-IR spectrum of graphene shows the broadband at ~3418 cm$^{-1}$ corresponding to vibration stretching OH groups of water molecule adsorbed on the graphene surface. The absorption peaks at 2921 cm$^{-1}$, and at 2852 cm$^{-1}$ match the symmetric and antisymmetric stretching vibration of $CH_2$, respectively (See H. Puzanowska-Tarasiewicz, E. Wotyniec, A. Kojlo, *Journal of Pharmaceutical and Biomedical Analysis*, 1996, v. 14, pp. 267-271, incorporated herein by reference in entirety). The two absorption peaks in the medium area at 1733 cm$^{-1}$ and 1637 cm$^{-1}$ correspond to C=O carbonyl/carboxyl and C=C aromatic groups present at the edges of GO. The absorption peaks at 1330 cm$^{-1}$ can be attributed to C—O of carboxylic acid (See H Karimi-Maleh, A A Ensafi, H Beitollahi, V Nasiri, M. A Khalilzadeh, P. Biparva, *Ionics*, 2012, v. 18, pp 687-694). The absorption peaks at 1229 cm$^{-1}$, and at 1122 cm$^{-1}$ are corresponding to stretching vibration of C—O of epoxide, and C—OH of alcohol groups.

Figure 3A:
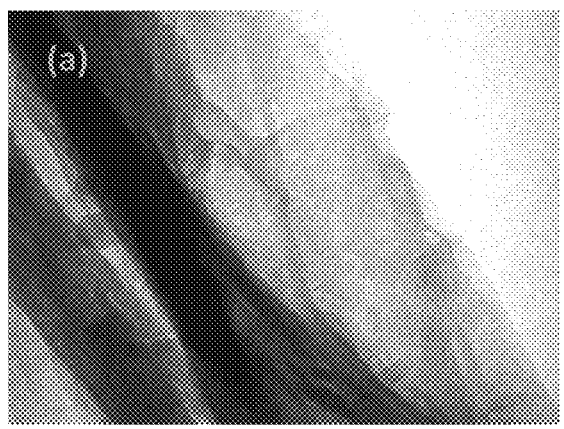
FIG. 3A shows a transition electron microscopy (TEM) image of the prepared graphene
Figure 3B:
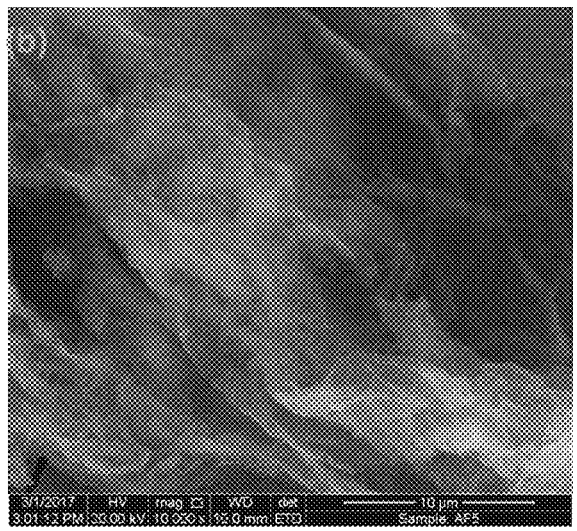
FIG. 3B shows a scanning electron microscopy (SEM) image of the prepared graphene
Figure 3C:
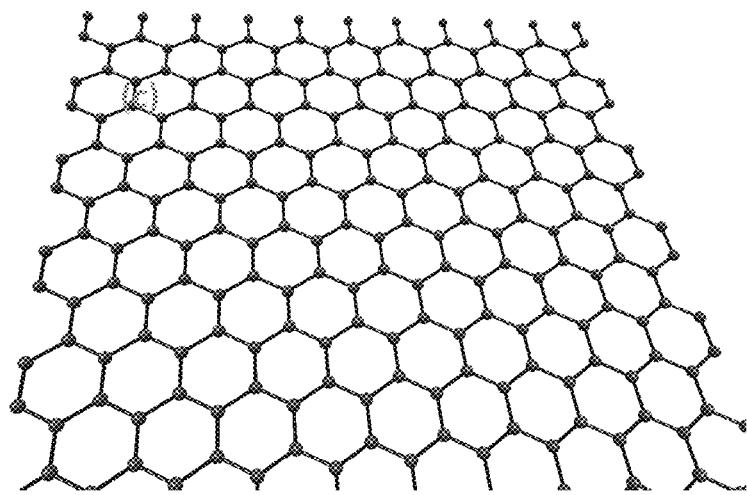
FIG. 3C shows a structure of the prepared graphene.
Figure 6:
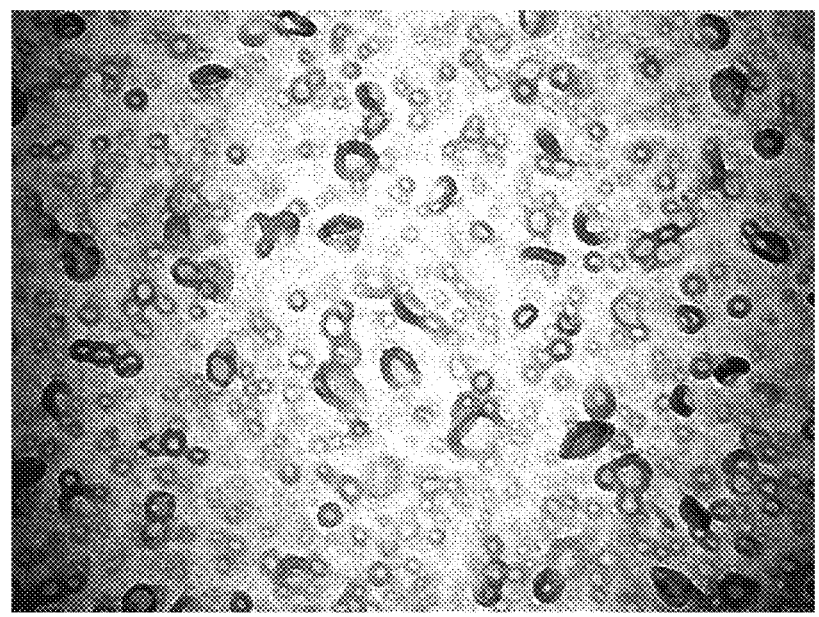
FIG. 6. TEM image of the prepared cycloheptaglucosan (beta-cyclodextrin) decorated on graphene.

The TEM image (FIG. 3) depicts the structure of the prepared graphene to be a transparent nanosheet. As shown in the TEM image in FIG. 6, the cycloheptaglucosan was well-decorated (co-planar oriented) on graphene. The complexation with cyclodextrin facilitates graphene attachment to steel (FIG. 7) while cycloheptaglucosan protects against the anions approaching the steel surface.

Example 2: Synthesis of Novel Cyclodextrin-Modified Reduced Graphene Oxide Composites by a One-Pot Hydrothermal Method Graphene oxide (GO) was produced by a modified Hummer's method by peroxidation of graphite waste. Next, the complex of cyclodextrin with graphene was synthesized by adding 40 ml of GO suspension at 0.5 mg ml$^{-1}$ and sonication for 1 hour. After re-suspension, 40 ml of cyclodextrin at 16 mg ml$^{-1}$ was added, followed by 600 μl ammonia to bring the pH=8.0. After adding 40 μL of hydrazine, the mixture was shaken for 5 minutes. The resultant mixture was stirred at 60° C. for 4 h. The black dispersion was filtered by a 0.22-micron pore-sized membrane filter to obtain rGO/CD nanosheets.

Example 3: Corrosion Protection Performance of the Coated Samples

Figure 8:
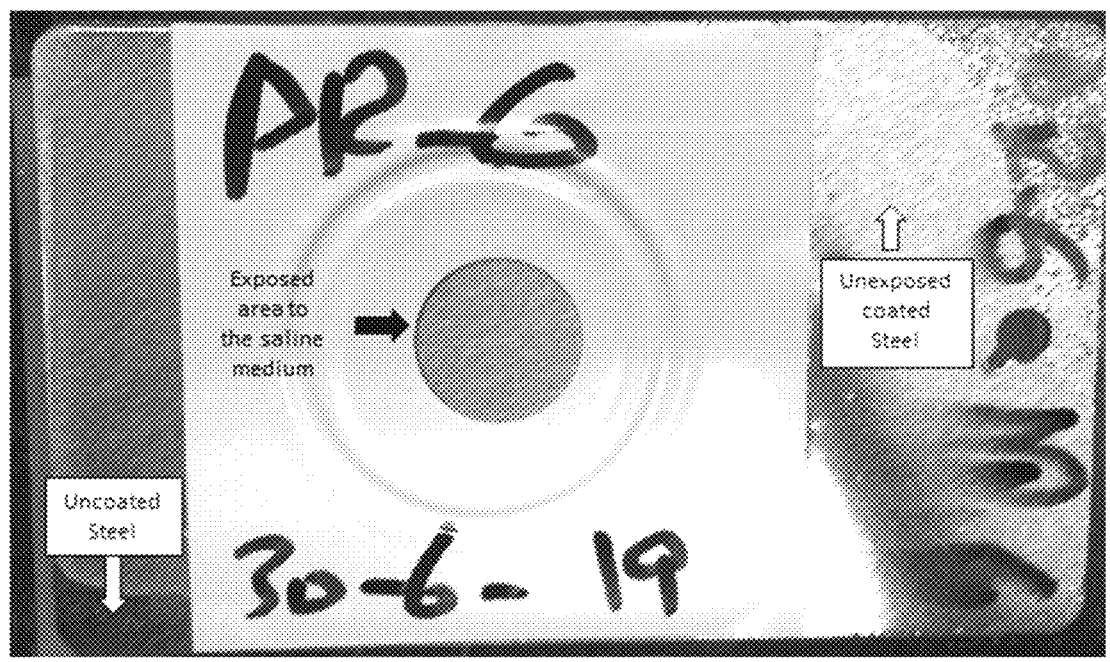
FIG. 8. Photo-digital image of a mild steel panel coated with the composite coating and exposed continuously to 3.5% NaCl solution for two weeks.
Figure 9:
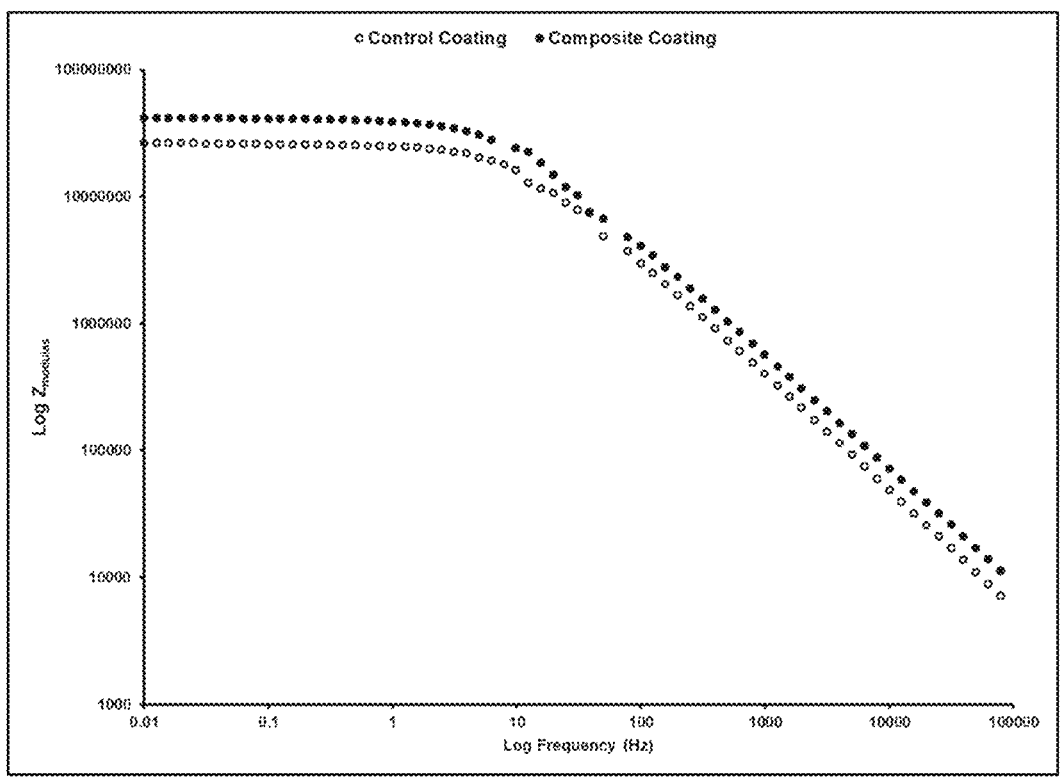
FIG. 9. EIS Bode plot of the control and composite coatings on mild steel after exposure to the 3.5% NaCl medium for two weeks at 25° C.

Next, the effect of the graphene coating additive on the corrosion protection properties of the parent coating was studied on mild steel in the saline medium. FIG. 8 shows the photo-digital image of the composite coating on mild steel after two weeks of exposure to 3.5% NaCl saline. Compared to the uncoated section of the panel, which suffered massive corrosion damage, the exposed area remained intact with no signs of corrosion, cracks, or coating delamination. For a quantitative comparison of both the control and composite coatings on mild steel, the electrochemical impedance spectroscopy (EIS) analysis on the two coated samples was conducted after a two-week exposure to the saline medium. FIG. 9 depicts the Bode plot representation of the EIS data of the two samples and reveals that the composite coating has a higher impedance value at low frequency (around 108 Ω·cm2) compared to the control coating. The result indicates better barrier properties for the composite coating layer against the passage of the hydroxyl and chloride corrosion mediators to the steel surface.

Figure 10:
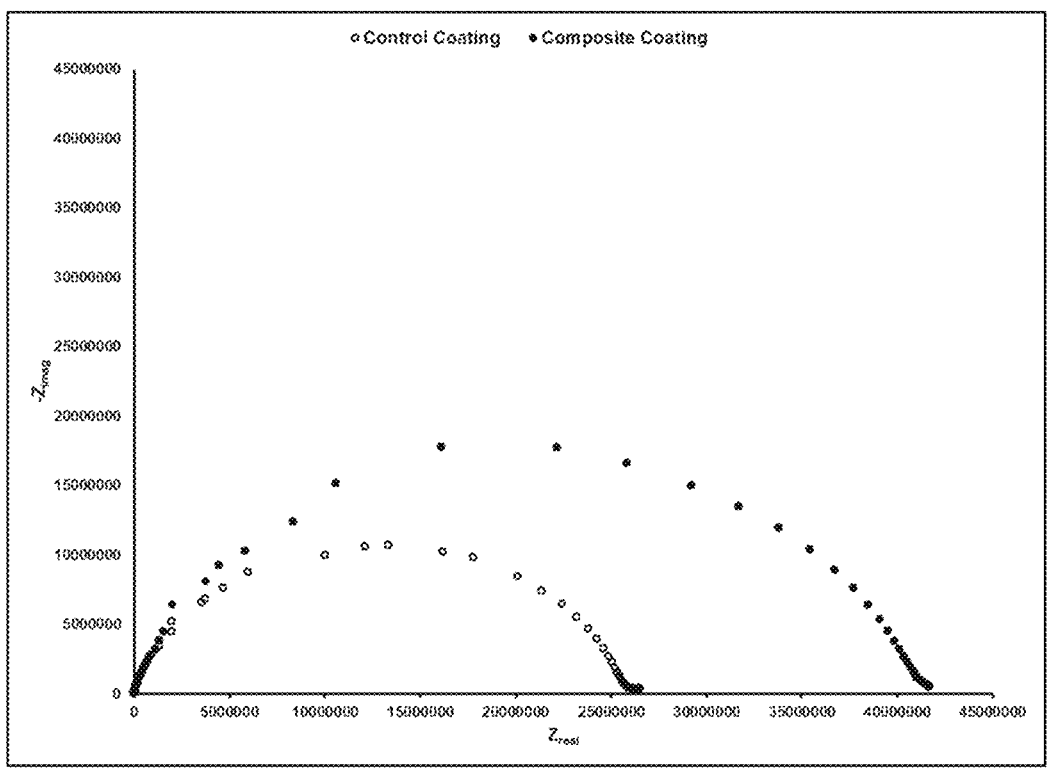
FIG. 10. EIS Nyquist plot of the control and composite coatings on mild steel after exposure to the 3.5% NaCl medium for two weeks at 25° C.
Figure 11:
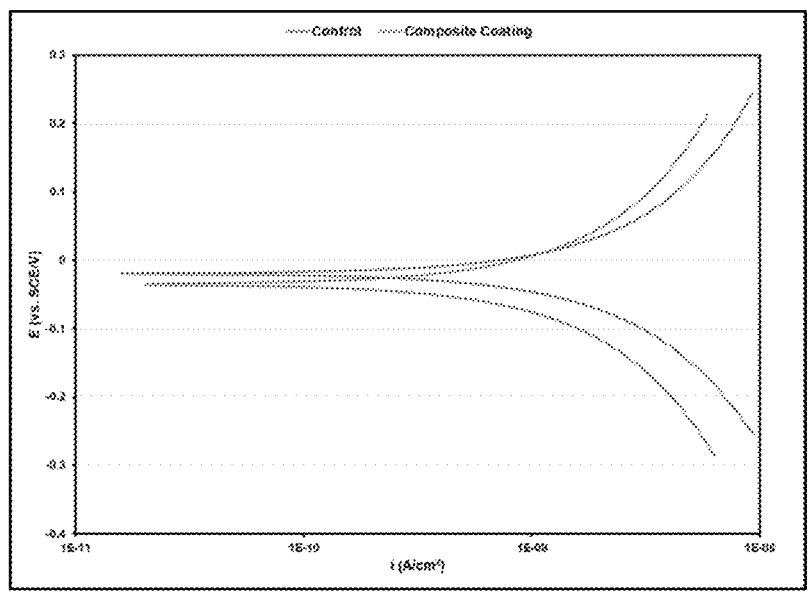
FIG. 11. Potentiodynamic polarization plots recorded for mild steel specimens coated with formulations with and without the cycloheptaglucosan-graphene additive after exposure to the 3.5% NaCl medium for two weeks at 25° C.

The EIS Nyquist plots of the two coated samples in the chloride solution (FIG. 10) showed a wider semi-circle for the composite coating sample compared to the control sample indicating a favorable impact of the cycloheptaglucosan-graphene additive on the anticorrosion properties of the bulk parent coating. The enhanced crosslink density and coating integrity properties resulting from the incorporated graphene additive lead to improvement. The potentiodynamic polarization measurement was conducted to see the effect of the CD-G complex on the corrosion-resistance performance of the parent coating matrix deposited on mild steel in the saline medium. The potentiodynamic polarization plots for mild steel panels coated using formulations with and without the graphene additive are shown in FIG. 11. Both the anodic and cathodic current densities ($I_{corr}$) could be seen to decrease with the use of CD-G additive, which reveals that cycloheptaglucosan decorated on graphene inhibited both the oxidative anodic and reductive cathodic reactions; therefore inhibiting the corrosion process.

Figure 12:
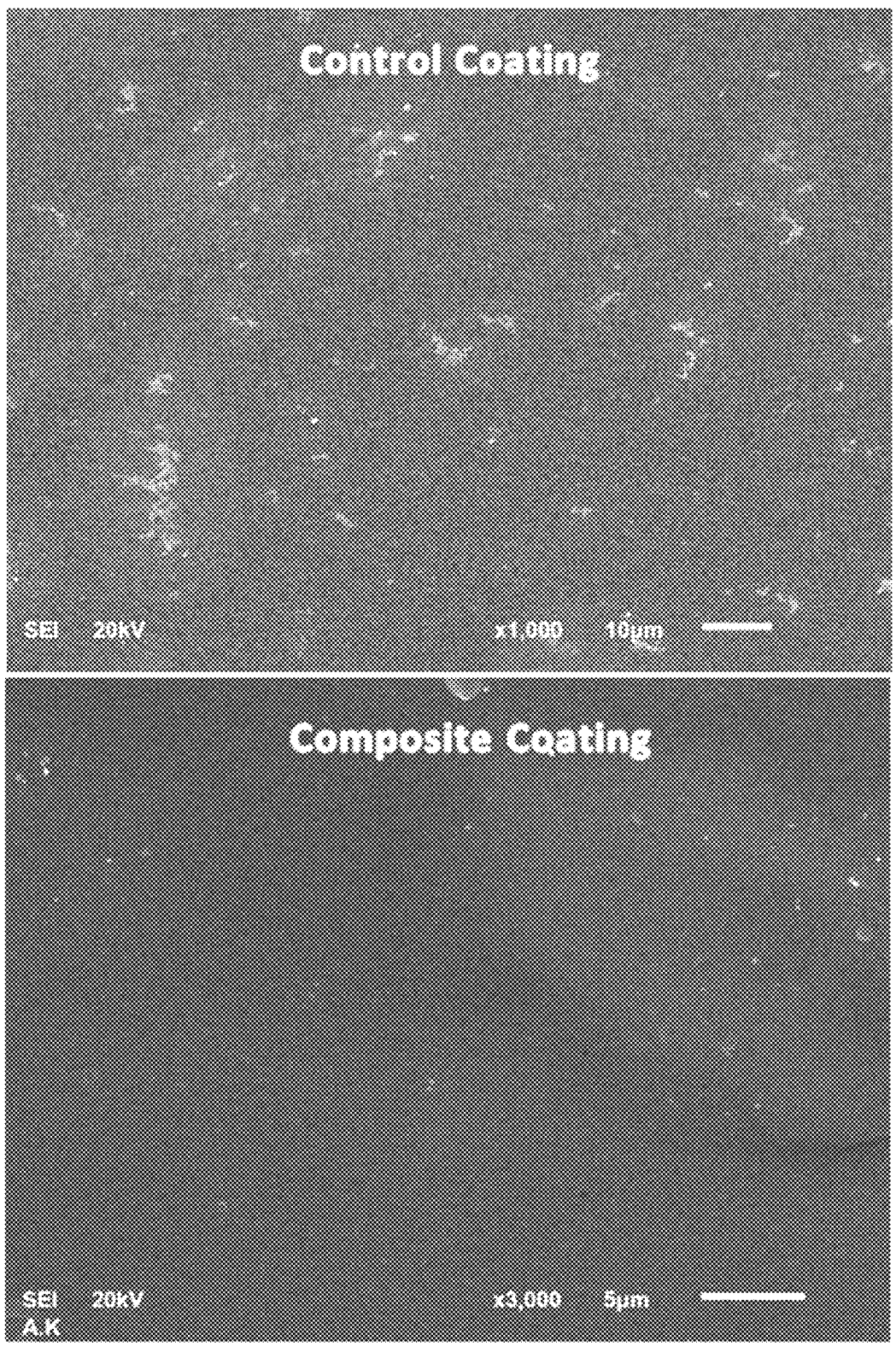
FIG. 12. Top-surface SEM images of the surface of control and composite coating matrices on mild steel after 2 weeks of exposure to 3.5% NaCl medium.

Morphological evaluation of the surface of the two coating matrices on mild steel was also conducted, and the obtained top-surface SEM photographic images are shown in FIG. 12. The photos indicate that the incorporation of the graphene additive into the control coating yielded a homogeneous, continuous, and crack-free coating layer on the steel surface. The result supports the suggested excellent compatibility and synergy between the parent control polymeric resin and the incorporated graphene additive. Moreover, the aqueous contact data for the two coated samples before exposure to the saline medium (Table 5) indicated enhanced hydrophobic properties for the graphene-incorporated coating layer on mild steel compared to the control coating. This hydrophobicity can be attributed to the effect of the high carbon content in the graphene additive. The lower drop (about 8°) in the contact angle value of the composite coating (Table 5) compared to the control coating (about) 27° is an indication for less wetting properties for the graphene-functionalized coating which is in direct relation with its excellent barrier properties in the saline medium.

TABLE 5

Aqueous contact angle (°) data of all coating matrices on mild steel before (BE) and after exposure (AE) to the saline medium.

| | Aqueous contact angle (Mean ± SD) | |
| --- | --- | --- |
| Sample | BE | AE |
| Control | 90.2 ± 1.1 | 65.6 ± 4.5 |
| Composite Coating | 98.2 ± 1.9 | 92.5 ± 3.5 |

SD = standard deviation

Example 4: Evaluation of the Corrosion Protection Performance of Epoxy Coatings Containing Mg Nanoparticle on Carbon Steel in 0.1 M NaCl Solution by SECM and EIS Techniques The effect of corrosion protection performance of epoxy coatings containing magnesium (Mg) nanoparticles on carbon steel was analyzed using scanning electrochemical microscopy (SECM) and electrochemical impedance spectroscopy (EIS). Localized measurements such as oxygen consumption and iron dissolution were observed using SECM in 0.1 M NaCl in the epoxy-coated sample. Line profile and topographic image analysis were measured by applying −0.70 and +0.60 V vs. the Ag/AgCl/saturated KCl reference electrode as the tip potential for the cathodic and anodic reactions, respectively. The tip current at −0.70 V for the epoxy-coated sample with Mg nanoparticles decreased rapidly, which is due to cathodic reduction in dissolved oxygen. The EIS measurements were conducted in 0.1 M NaCl after wet and dry cyclic corrosion test. The increase in the film resistance (R f) and charge transfer resistance (R ct) values was confirmed by the addition of Mg nanoparticles in the epoxy coating. Scanning electron microscope/energy-dispersive X-ray spectroscopic analysis showed that Mg was enriched in corrosion products at a scratched area of the coated steel after corrosion testing. Focused ion beam-transmission electron microscope analysis confirmed the presence of the nanoscale oxide layer of Mg in the rust of the steel, which had a beneficial effect on the corrosion resistance of coated steel by forming protective corrosion products in the wet/dry cyclic test.

Example 5: Preparation of Magnesium-Rich Composite Coating and Performance Enhancement by Graft Modification of Epoxy Resin Spherical Mg powder (active Mg≥99.8%) with a particle size of 60 μm (200 mesh) or 30 μm (400 mesh) was purchased from Tangshan Weihao Magnesium Powder Co., Ltd (Hebei China). The epoxy resin (E 20, colorless, transparent solid) and reactive polyamide curing agent (Ancamide 221, yellow-brown clear liquid) were purchased from Air Products (USA); The γ-(2, 3-epoxypropoxy) propytrimethoxysilane (KH560), 3-Triethoxysilylpropylamine APTES (KH550) (content>98%) and hydroxyl-terminated polydimethylsiloxane (PDMS) were purchased from Nanjing Union Silicon Chemical Co., Ltd (Nanjing China); Dibutyltindilaurate (DBTDL) was used as catalyst, which was purchased from Nan Tong Advance Chemicals Co. Ltd (Nantong China); The 2024 Al alloy (CHALCO) plates were obtained from Shanghai Baoxi Industrial Co., Ltd (Shanghai China).

Mg powder was pre-modified before using it. First, Mg powders were immersed in xylene for about 6 hr, and then 10% of KH560 was added after removing the excess xylene. After vibrating sufficiently, the system was incubated for about 12 hr and then filtrated to remove the excess KH560. Epoxy resin at 60 parts, pre-modified Mg powders at 40 parts, and the solvent were added together in that order. The above mixture was intensely stirred at 3000 rpm for 20-30 min to obtain component A (the main agent). The curing agent of ancamide221 was first diluted to 50% and then mixed with component A in the mass ratio of 6:10 to obtain the Mg-rich resin. 2024-Al alloy plates were selected as substrates of Mg-rich primer. The 2024-Al alloy plates with 2 mm thickness were cut into the size of 150×70 mm and 50×50 mm, respectively. The cut plates were polished by 200 mesh abrasive and were then cleaned by acetone. The Mg-rich primer samples were prepared by spraying Mg-rich coating on the pre-treated substrates and curing at room temperature (STP). The coating's thickness was within 150±10 μm. The coating was smooth with uniform thickness and welding wire back of the plate, to produce a working electrode (50×50 mm plates). Finally, the back & four sides of the plate were sealed by epoxy resin and adhesive.

The modified epoxy resin was prepared through two steps. First, to 300 g of epoxy resin (70% solids), 10-20 g of KH550, and 0.6 g of DBTDL catalyst were added in a 500 ml flask equipped with an Dean-Stark and the mixture was then heated to 60° C. at 500 rpm and reacted for 2 hr under purging nitrogen. Subsequently, 20-40 g hydroxyl-terminated PDMS and 0.8 g DBTDL catalyst was added in the above system under stirring and purging nitrogen. The resultant mixture was then heated to 155-160° C. and reacted (about 4 hr) until no ethanol produced. Finally, the modified product was obtained by cooling the reaction system down to ambient temperature.

The results indicate Mg powder with small particle size for the coatings with smooth surface and performances to resist salt spray and aging. The critical pigment volume concentration (CPVC) for 200 mesh Mg powder is 40%-45% and is about 50% for 400 mesh Mg powder. Results of EIS and Tafel polarization curves indicate Mg-rich primer can provide effective electrochemical protection for Al alloy.

Example 6: Sequential Deposition of Multiple Protective Layers on Steel

In this experiment, the most essential two components of the composite coating—an inner barrier epoxy-based coating intended to carry CD-G complex and the outer silicon antifouling layer were tested for compatibility, adhesion and the functional performance in the real seawater.

Materials Used

Epoxy resin A (trade name: Epicoat 1001, epoxy equivalent: 475, available from Shell Co., Ltd.); Epoxy resin B (trade name: Epicoat 834, epoxy equivalent: 250, available from Shell Co., Ltd.); Epoxy resin C (trade name: Epicoat 828, epoxy equivalent: 190, available from Shell Co., Ltd.); Hydroxyl group-containing terpenephenol resin A (trade name YP-90L, number-average molecular weight 440, mixture of resins each having 1 to 3 hydroxyl groups in one molecule, available from Yasuhara Chemical Co., Ltd. Hydroxyl group-containing terpenephenol resin B (trade name YP-90, resin having 2 hydroxyl groups in one molecule, available from Yasuhara Chemical Co., Ltd.); Hydroxyl group-containing petroleum resin (trade name: Neopolymer E-100, number-average molecular weight: 450, divinyltoluene/indene copolymer having one hydroxyl group in one molecule, available from Nippon Petrochemicals Co. Ltd.); Coumarone resin (trade name. ESCURON V-120, number-average molecular weight: 730, available from Nippon Steel Chemical Co., Ltd.; Anti-sagging agent (trade name: Disperon 6650, fatty acid amide wax, available from Kusumoto Chemicals, Ltd.); Curing agent for epoxy resins (trade name: Lackamide TD-966, polyamide, active hydrogen equivalent 377 available from Dainippon Ink and Chemicals Inc.); Oraganoploysiloxane Antifouling Coating SI-1; Blend of KE-445 trade name, silicone resin, viscosity: 5 Pa·s, available from Shin-Etsu Chemical Co Ltd.) and KF-96-100cs (trade name silicone oil, viscosity: 100 centistokes, available from Shin-Etsu Chemical Co., Ltd.) in a solids content weight ratio of 100:30; Organopolysiloxane Antifouling Coating SI-2; Blend of TSE388 (trade name, silicone resin, viscosity: 10 Pa·s, available from Toshiba Silicone Co., Ltd.) and TSF4300 (trade name, silicone oil, viscosity: 140 centistokes, available from Toshiba Silicone Co., Ltd.) in a solids content weight ratio of 100:30.

Anti-Corrosive/Antifouling Coating Laminate

In a 1-liter polyethylene container, 100 parts of the epoxy resin A, 30 parts of the hydroxyl group-containing terpenephenol resin A, 50 parts of titanium white, 100 parts of talc, 60 parts of silica, 5 parts of an anti-sagging agent, 20 parts of xylene and 10 parts of methyl isobutyl ketone (MIBK) were stirred to homogeneity, whereby the main agent was prepared. To the main agent, 60 parts of polyamide were added as a curing agent and stirred, whereby an epoxy undercoating composition was obtained.

Subsequently, the epoxy anticorrosive coating composition was applied onto a sandblasted steel plate (150×70×3.2 mm) by airless spraying so that the film thickness (dry film thickness) should become about 200 μm and then dried for 7 days in an atmosphere of 65 percent relative humidity (RH) at 20° C. Onto the surface of the resulting epoxy anticorrosive coating film, the organopolysiloxane antifouling coating SI-1 was further applied as a finish coating so that the dry second film thickness should become 100 μm. This coated plate was dried at room temperature (20° C.) for 7 days to form an organopolysiloxane antifouling composite coating film. The laminated films were varied compositionally, as shown in Table 6. In some compositions, an epoxy resin coating (trade name: Epicon HB-AL, available from Chugoku Marine Paints Ltd.) was used, and in the other, the epoxy resin binder (trade name: Epicon HB-AL binder, available from Chugoku Marine Paints, Ltd.) was used.

TABLE 6

The compositions used in the formation of a dual protective layer coating. The Arabic numbers in the top row indicate the tested experimental compositions, the numbers in the subsequent rows indicate weight parts, except E - epoxy resin coating, 60 parts, and EB - epoxy resin binder, 60 parts. Summarizing the parts in each column reconstitutes the composition of interest, referring to the inner layer. The composition and the suppliers of the outer layer composition (SI-1, SI-2, last row) are provided above.

| Component of the inner coating | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Epoxy Resin A | 100 | | 60 | 60 | 60 | 100 | 60 | 60 | 60 | 100 | 60 | 60 | E | EB |
| Epoxy Resin B | | | 40 | 40 | 40 | | 40 | 40 | | | 40 | 40 | | |
| Epoxy Resin C | | 100 | | | | | | | | | | | | |
| Hydroxy-group containing terpenephenol resin A | 30 | 30 | 15 | 30 | | | | | | | | | | |
| Hydroxyl group-containing terpenephenol resin B | | | | | 15 | | | | | | | | | |

TABLE 6-continued The compositions used in the formation of a dual protective layer coating. The Arabic numbers in the top row indicate the tested experimental compositions, the numbers in the subsequent rows indicate weight parts, except E - epoxy resin coating, 60 parts, and EB - epoxy resin binder, 60 parts. Summarizing the parts in each column reconstitutes the composition of interest, referring to the inner layer. The composition and the suppliers of the outer layer composition (SI-1, SI-2, last row) are provided above.

| Component of the inner coating | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Hydroxyl group-containing pen oleum resin | | | | | | 45 | 30 | 20 | 15 | | | | | |
| Coumarone resin | | | 30 | 15 | 30 | | 15 | 25 | 30 | 45 | 45 | | | |
| Titanium white | 50 | 50 | 50 | 50 | 50 | 50 | 50 | 50 | 50 | 50 | 50 | 50 | 50 | 50 |
| Talc | 100 | 100 | 100 | 100 | 100 | 100 | 100 | 100 | 100 | 100 | 100 | 100 | 100 | 100 |
| Silica | 60 | 60 | 60 | 60 | 60 | 60 | 60 | 60 | 60 | 60 | 60 | 60 | 60 | 60 |
| Anti-sagging agent | 5 | 5 | 5 | 5 | 5 | 5 | 5 | 5 | 5 | 5 | 5 | 5 | 5 | 5 |
| Xylene | 20 | 20 | 20 | 20 | 20 | 20 | 20 | 20 | 20 | 20 | 20 | 20 | 20 | 20 |
| Methyl isobutyl ketone (MIBKi | 10 | 10 | 10 | 10 | 10 | 10 | 10 | 10 | 10 | 10 | 10 | 10 | 10 | 10 |
| Curing agent | 60 | 60 | 60 | 60 | 60 | 60 | 60 | 60 | 60 | 60 | 60 | 60 | 60 | 60 |
| Organopolysiloxane antifouling coating 60 (Outer coating) | SI-1 | Si-1 | Si-1 | Si-2 | Si-2 | Si-2 | SI-1 | Si-2 | Si-2 | Si-1 | SI-2 | Si-2 | SI-1 | SI-2 |

The coated plates, each having an antifouling composite coating film, which had been obtained in the experiments of Table 6, were set on an immersion raft and immersed in the sea at a depth of 1 m. After 6 months and 12 months, anticorrosion property and adhesion were evaluated based on the evaluation criteria, as shown in Table 7.

TABLE 7

Retention of adhesion by the protective bi-layer coating on a carbon steel plate, immersed in seawater. After immersion for 6 months and 12 months, the occurrence of a blister on the coating film surface of the test plate was examined by visual observation. AA: pass BB: blistered; After immersion for 6 months and 12 months, on the surface of the test plate, a cut in the form of a cross was made with a knife, then the edge of a blade of the cutter was inserted at the cut portion, and the occurrence of peeling was examined by visual observation to evaluate adhesion between the anticorrosive coating film and the silicone antifouling coating film.

| Experiment | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Months of exposure | 6 | 6 | 6 | 6 | 6 | 6 | 6 | 6 | 6 | 6 | 6 | 6 | 6 | 6 |
| Result: anticorrosion | AA | AA | AA | AA | AA | AA | AA | AA | AA | AA | CC | CC | CC | AA |
| Results: adhesion after immersion | AA | AA | AA | AA | AA | AA | AA | AA | AA | BB | CC | CC | CC | AA |
| Months of exposure | 12 | 12 | 12 | 12 | 12 | 12 | 12 | 12 | 12 | 12 | 12 | 12 | 12 | 12 |
| Results: anticorrosion | AA | AA | AA | AA | AA | AA | AA | AA | AA | AA | CC | CC | CC | AA |
| Results: adhesion after immersion | AA | AA | AA | AA | AA | AA | AA | AA | AA | BB | CC | CC | CC | AA |

AA: good, BB: slightly bad. CC: bad

The results of the experiment indicate that the compositions 1-9 and 14 are suitable for long-term protection of steel in ocean water as a basal coating. Incorporation of CD-G complex in basal coatings further improves corrosion resistance.

The invention claimed is:

1. A graphene and beta-cyclodextrin composition, comprising:
   graphene nanosheets and a beta-cyclodextrin,
   wherein the beta-cyclodextrin is present on the surface of the graphene nanosheets in a co-planar orientation and the beta-cyclodextrin encapsulates the graphene nanosheets by covering >90% of the surface of the graphene nanosheets;
   wherein one or more hydroxyl groups on the beta-cyclodextrin are bonded with one or more functional groups selected from the group consisting of an epoxy group, an acrylic group, an isocyanate group and an amide group, and
   wherein the functional group bonded to the hydroxyl group of the beta-cyclodextrin is covalently bonded to the graphene nanosheets.

2. The graphene and beta-cyclodextrin composition of claim 1, further comprising:
   one or more additional alpha and/or gamma cyclodextrins bonded to the hydroxyl groups of the beta-cyclodextrin to form an interpenetrating network within a basal matrix of a coating on a substrate and wherein the additional alpha and/or gamma cyclodextrins form nodes of the interpenetrating network with a number of bonds >2.

3. The graphene and beta-cyclodextrin composition of claim 1, wherein the hydroxyl groups on the beta-cyclodextrin are bonded with an epoxy group.

4. The graphene and beta-cyclodextrin composition of claim 1, wherein the hydroxyl groups on the beta-cyclodextrin are bonded with an acrylic group.

5. The graphene and beta-cyclodextrin composition of claim 1, wherein the hydroxyl groups on the beta-cyclodextrin are bonded with an isocyanate group.

6. The graphene and beta-cyclodextrin composition of claim 1, wherein the hydroxyl groups on the beta-cyclodextrin are bonded with an amide group.

* * * * *